US012581091B2

(12) United States Patent
Andrivon et al.

(10) Patent No.: US 12,581,091 B2
(45) Date of Patent: Mar. 17, 2026

(54) METHODS AND APPARATUS OF ENCODING/DECODING VIDEO PICTURE DATA

(71) Applicant: Beijing Xiaomi Mobile Software Co., Ltd., Beijing (CN)

(72) Inventors: Pierre Andrivon, Beijing (CN); Fabrice Leléannec, Beijing (CN); Miloš Radosavljević, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/850,323

(22) PCT Filed: Oct. 6, 2022

(86) PCT No.: PCT/CN2022/123713
§ 371 (c)(1),
(2) Date: Sep. 24, 2024

(87) PCT Pub. No.: WO2023/184923
PCT Pub. Date: Oct. 5, 2023

(65) Prior Publication Data
US 2025/0267281 A1      Aug. 21, 2025

(30) Foreign Application Priority Data
Mar. 28, 2022 (EP) .................................... 22305382

(51) Int. Cl.
*H04N 19/147* (2014.01)
*H04N 19/129* (2014.01)
*H04N 19/172* (2014.01)

(52) U.S. Cl.
CPC ......... *H04N 19/147* (2014.11); *H04N 19/129* (2014.11); *H04N 19/172* (2014.11)

(58) Field of Classification Search
CPC ... H04N 19/147; H04N 19/129; H04N 19/172
(Continued)

(56) References Cited

U.S. PATENT DOCUMENTS

| | | | |
|---|---|---|---|
| 2017/0195620 A1* | 7/2017 | Gates | ..................... H04N 19/40 |
| 2020/0021849 A1* | 1/2020 | Esenlik | ................ H04N 19/176 |
| 2021/0006785 A1* | 1/2021 | Lee | ......................... H04N 19/70 |

FOREIGN PATENT DOCUMENTS

| | | |
|---|---|---|
| CN | 102428656 A | 4/2012 |
| CN | 113615188 A | 11/2021 |

(Continued)

OTHER PUBLICATIONS

ISA/CN National Intellectual Property Administration, Written Opinion and Search Report of the International Searching Authority Issued in Application No. PCT/CN2022/123713, Dec. 15, 2022, WIPO, 11 pages.

(Continued)

*Primary Examiner* — Allen C Wong
(74) *Attorney, Agent, or Firm* — Finnegan, Henderson, Farabow, Garrett & Dunner, L.L.P.

(57) ABSTRACT

A method for decoding a video picture from a bitstream of encoded video picture data includes: obtaining a decoded video picture by decoding encoded video picture data from a bitstream of encoded video picture data; and obtaining a video picture by de-converting, according to a conversion mode, at least one picture area of the decoded video picture, wherein the conversion mode defines a combination of at least one flipping operation and at least one rotation operation to the picture are.

13 Claims, 14 Drawing Sheets

(58) Field of Classification Search
USPC .................................................... 375/240.02
See application file for complete search history.

(56) References Cited

FOREIGN PATENT DOCUMENTS

KR          20190109880 A      9/2019
WO      WO 2008024345 A1      2/2008

OTHER PUBLICATIONS

Extended European Search Report Issued in Application No. 22305382.8 dated Sep. 16, 2022, 10 pages.

Murakami, T., "Adaptive Picture Flipping Coding", Hitachi, Ltd., International Telecommunication Union, Telecommunication Standardization Sector, COM 16—D 92—E, Geneva, Jul. 26-Aug. 5, 2005, 6 pages.

Zhang, Z., "Rotate Intra Block Copy", Massachusetts Institute of Technology, Joint Video Experts Team (VJET) of ITU-T SG 16 WP 3 and ISO/IEC JTC 1/SC 29/WG 11, Document: JVET-L0041-v1, 12th Meeting: Macao, CN, Oct. 3-12, 2018, 7 pages.

Extended European Search Report Issued in Application No. 22306498.1 dated Jun. 7, 2023, 10 pages.

Aminlou, A., "CE4-related: Support large rotation and flipping in affine and PROF", Nokia, Joint Video Experts Team (VJET) of ITU-T SG 16 WP 3 and ISO/IEC JTC 1/SC 29/WG 11, Document: JVET-P0600, 16th Meeting: Geneva, CH, Oct. 1-11, 2019, 6 pages.

* cited by examiner

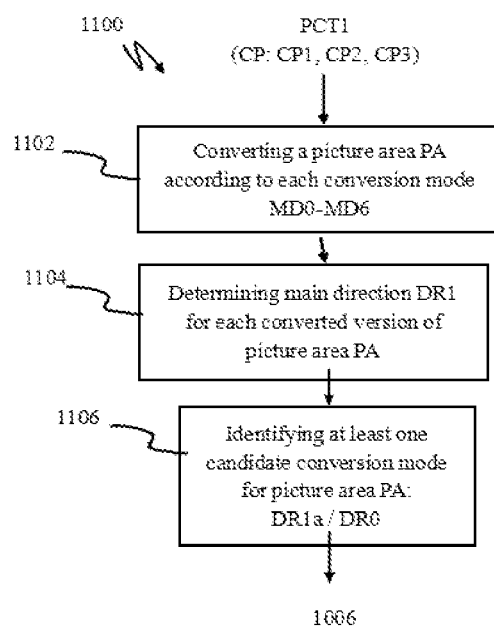

1100

PCT1
(CP: CP1, CP2, CP3)

1102 — Converting a picture area PA according to each conversion mode MD0-MD6

1104 — Determining main direction DR1 for each converted version of picture area PA 1106 — identifying at least one candidate conversion mode for picture area PA: DR1a / DR0

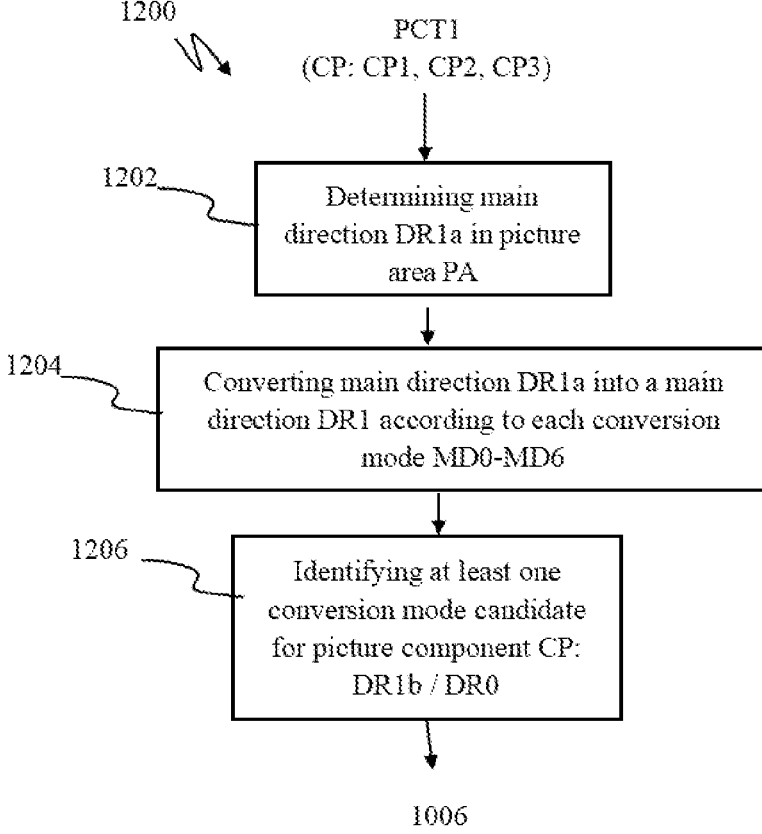

1200

PCT1
(CP: CP1, CP2, CP3)

1202 — Determining main direction DR1a in picture area PA

1204 — Converting main direction DR1a into a main direction DR1 according to each conversion mode MD0-MD6

1206 — Identifying at least one conversion mode candidate for picture component CP: DR1b / DR0

METHODS AND APPARATUS OF ENCODING/DECODING VIDEO PICTURE DATA

CROSS REFERENCE TO RELATED APPLICATIONS

This application is a U.S. national phase application of International Application No. PCT/CN2022/123713, filed on Oct. 6, 2022, which claims priority to and benefits of European Patent Application No. 22305382.8, filed on Mar. 28, 2022, the entire contents of both of which are incorporated herein by reference.

FIELD

The present application generally relates to video picture encoding and decoding. Particularly, but not exclusively, the technical field of the present application is related to encoding a video picture into a bitstream of encoded video picture data, decoding such a bitstream into a decoded video picture and corresponding encoding and decoding devices.

BACKGROUND

The present section is intended to introduce the reader to various aspects of art, which may be related to various aspects of at least one exemplary embodiment of the present application that is described and/or claimed below. This discussion is believed to be helpful in providing the reader with background information to facilitate a better understanding of the various aspects of the present application. Accordingly, it should be understood that these statements are to be read in this light, and not as admissions of prior art.

The video compression standard Advanced Video Coding (AVC), also referred to as H.264 or MPEG-4 part 10, Advanced Video Coding (MPEG-4 AVC), introduced Flexible Macroblock Ordering (FMO) and Arbitrary Slice Ordering (ASO). These techniques involve changing or prioritizing the order in which blocks or slices of video pictures are encoded into a bitstream of encoded video picture data. Encoding gains can thus be achieved as conventional video codecs use raster scan to scan each block or slice in video picture data. The above techniques allow creating a causal area (I.e., area of content already encoded or decoded, and known for the current block to be encoded at the decoder) wherein reference samples used for prediction and other predictions have more accuracy. FMO and ASO techniques improve flexibility of the design of video encoding and decoding and allow a greater adaptation to signal characteristics.

SUMMARY

The following section presents a simplified summary of the at least one exemplary embodiment in order to provide a basic understanding of some aspects of the present application. This summary is not an extensive overview of an exemplary embodiment. It is not intended to identify key or critical elements of an exemplary embodiment. The following summary merely presents some aspects of the at least one exemplary embodiment in a simplified form as a prelude to the more detailed description provided elsewhere in the document.

According to a first aspect of the present application, there is provided a method for encoding a video picture comprising at least one picture area, said method comprising:

selecting a conversion mode defining a combination of at least one flipping operation and at least one rotation operation to said at least one picture area;

converting said at least one picture area, based on the selected conversion mode, into at least one converted picture area; and encoding the at least one converted picture area into a bitstream of encoded video picture data.

According to a second aspect of the present application, there is provided a method for decoding a video picture from a bitstream of encoded video picture data, wherein the method comprises:

obtaining a decoded video picture by decoding encoded video picture data from the bitstream of encoded video picture data; and obtaining the video picture by de-converting, according to a conversion mode, at least one picture area of the decoded video picture, wherein the conversion mode defines a combination of at least one flipping operation and at least one rotation operation to said picture area.

According to a third aspect of the present application, there is provided a bitstream formatted to include encoded video picture data and component conversion information obtained from one of a method according to the first aspect of the present application.

According to a fourth aspect of the present application, there Is provided an apparatus for encoding a video picture into a bitstream of encoded video picture data, the apparatus comprising means for performing a method according to the first aspect of the present application.

According to a fifth aspect of the present application, there is provided an apparatus for decoding a video picture from a bitstream of encoded video picture data, the apparatus comprising means for performing a method according to the second aspect of the present application.

According to a sixth aspect of the present application, there is provided a non-transitory storage medium carrying instructions of program code for executing a method according to the first aspect of the present application.

According to a seventh aspect of the present application, there is provided a non-transitory storage medium carrying instructions of program code for executing a method according to the second aspect of the present application.

BRIEF DESCRIPTION OF THE DRAWINGS

Reference will now be made, by way of example, to the accompanying drawings which show exemplary embodiments of the present application, and in which:

FIG. 11 shows an encoding method according to at least one particular exemplary embodiment of the present application;

FIG. 12 shows an encoding method according to at least one particular exemplary embodiment of the present application;

Similar or same elements are referenced with the same reference numbers.

DESCRIPTION OF EXEMPLARY EMBODIMENTS

Figure 1:
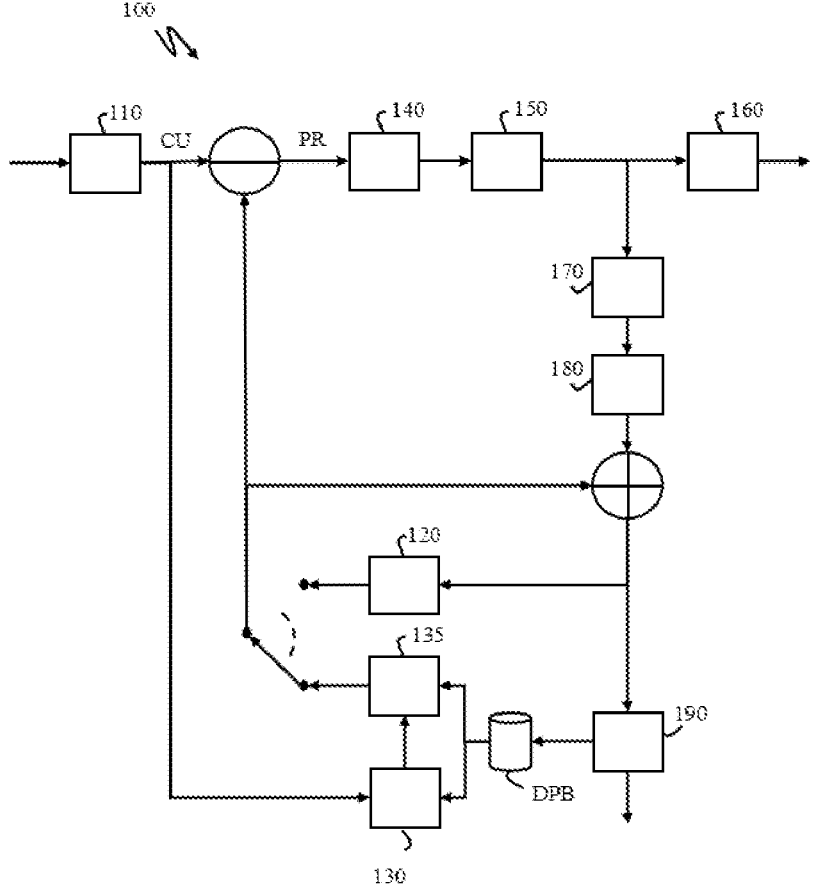
FIG. 1 shows a schematic block diagram of steps of a method 100 of encoding a video picture VP In accordance with prior art.

Exemplary embodiments are described hereinafter with reference to the accompanying figures. An exemplary embodiment may, however, be embodied in many alternate forms and should not be construed as limited to the examples set forth herein. Accordingly, it should be understood that there is no intent to limit exemplary embodiments to the particular forms disclosed. On the contrary, the present application is intended to cover all modifications, equivalents, and alternatives falling within the spirit and scope of the present application.

A problem arising from the above techniques in the Background is the increased decoding complexity which as a result makes implementation of video encoders and decoders more difficult and expensive.

Various solutions have been recently developed to address decoding complexity induced by block reordering techniques. In substance, these known solutions propose changing the picture to be coded rather than the actual block order so that, virtually, blocks are scanned during encoding as if they were arranged in another order than the original block order of the video pictures.

Patent document WO2008024345A1 relates to adaptative region-based flipping video encoding and discloses more particularly methods and apparatus for video encoding and decoding using region-based flipping. An encoding apparatus includes a video encoder for encoding image regions of a picture into a resultant bitstream, wherein at least one of the image regions is flipped before encoding. Flipping is also performed on image regions when decoding image regions from the bitstream.

U.S. Pat. No. 9,549,195 B2 relates to image decoding device and method thereof using inter-coded predictive encoding and discloses more particularly an encoding device Including an image conversion module that converts the direction of the images using right-left symmetry mode conversion or up-down symmetry mode conversion. A decoding method is also provided for decoding a signal of an intra-coded image, wherein it is determined whether a partial area of the image has been converted in an up-down symmetry conversion mode to flip the partial area of the image vertically or in a right-left symmetry conversion mode to flip the partial area horizontally with reference to information send together with the signal of the image. An encoded image is then decoded by executing a conversion associated with a determined conversion mode after intra-coded predicting.

Patent document WO2012121744A1 relates to adaptive picture rotation and discloses more particularly a method for decoding a picture embedded in a coded video sequence using a reference picture, the method comprising receiving at least a part of the coded video sequence; decoding the at least a part of the coded video sequence to determine a rotation of the embedded picture; rotating at least a part of the reference picture according to the determined rotation; and using that at least a part of a rotated reference picture to construct a reconstructed picture corresponding to the embedded picture.

The above state-of-the-art solutions, based on either flipping or rotation of pictures or picture regions, give rise to a relatively low decoding complexity and can thus address the problem of decoding complexity arising from changing block order scanning. However, these state-of-the-art solutions are not always satisfactory as it would be desirable to achieve higher compression gains. These known techniques can also be computationally intensive at the encoding side as a conversion mode selection may be performed based on rate distortion algorithms where all conversion modes are coded prior to deciding on the conversion mode to select. This may result in a significant increase of encoding time, thereby hindering the technology adoption in a coding standard despite decoding simplicity. In case of iterative splitting algorithms (WO2008024345A1), this problem of computation intensity may be even worse as the number of combinations to test is combinatorial.

In particular, the known coding/decoding techniques do not always provide sufficient flexibility in the way video pictures are encoded/decoded, thereby resulting in limited compression efficiency and latency. Video content may vary drastically from one video signal to another (picture characteristics, structure orientations, etc.). This video content variability needs to be addressed to ensure compression efficiency and avoid latency. This problem of lack of encoding/decoding flexibility arises notably when coding/decoding signals exhibit specific characteristics (e.g., video gaming, screen content, vertical videos . . . ) which require adaptability in the way encoding/decoding is performed.

There is thus a need for encoding and decoding techniques ensuring encoding and decoding efficiency as well as low complexity. In particular, compression efficiency with encoding/decoding flexibility and adaptability is needed.

At least one of the aspects generally relates to video picture encoding and decoding, one other aspect generally relates to transmitting a bitstream provided or encoded and one other aspects relates to receiving/accessing a decoded bitstream.

At least one of the exemplary embodiments is described for encoding/decoding a video picture but extends to the encoding/decoding of video pictures (sequences of pictures) because each video picture may be sequentially encoded/decoded as described below.

Moreover, the at least one exemplary embodiments are not limited to MPEG standards such as AVC (ISO/IEC 14496-10 Advanced Video Coding for generic audio-visual services, ITU-T Recommendation H.264, https://www.itu-.int/rec/T-REC-H.264-202108-P/en), EVC (ISO/IEC 23094-1 Essential video coding), HEVC (ISO/IEC 23008-2 High Efficiency Video Coding, ITU-T Recommendation H.265, https://www.itu.int/rec/T-REC-H.265-202108-P/en, WC (ISO/IEC 23090-3 Versatile Video Coding, ITU-T Recommendation H.266, https://www.itu.int/rec/T-REC-H.266-202008-I/en) but may be applied to other standards and recommendations such as AV1 (AOMedia Video 1, http://aomedia.org/av1/specification/) for example. The at least one exemplary embodiment may apply to pre-existing or future-developed, and extensions of any such standards and recommendations. Unless indicated otherwise, or technically precluded, the aspects described in the present application may be used individually or in combination.

A pixel corresponds to the smallest display unit on a screen, which can be composed of one or more sources of light (1 for monochrome screen or 3 or more for colour screens).

A video picture, also denoted frame or picture frame, comprises at least one component (also called picture component, or channel) determined by a specific picture/video format which specifies all information relative to pixel values and all information which may be used by a display unit and/or any other device to display and/or to decode video picture data related to said video picture.

A video picture comprises at least one component usually expressed in the shape of an array of samples.

A monochrome video picture comprises a single component and a color video picture may comprise three components.

For example, a color video picture may comprise a luma (or luminance) component and two chroma components when the picture/video format is the well-known (Y,Cb,Cr) format or may comprise three color components (one for Red, one for Green and one for Blue) when the picture/video format is the well-known (R,G,B) format.

Each component of a video picture may comprise a number of samples relative to a number of pixels of a screen on which the video picture is intended to be display. For instance, the number of samples comprised in a component may be the same as, or a multiple (or fraction) of, a number of pixels of a screen on which the video picture is intended to be display.

The number of samples comprised in a component may also be a multiple (or fraction) of a number of samples comprised in another component of a same video picture.

For example, in the case of a video format comprising a luma component and two chroma components like the (Y,Cb,Cr) format, dependent on the color format considered, the chroma component may contain half the number of samples in width and/or height, relative to the luma component.

A sample is the smallest visual information unit of a component composing a video picture. A sample value may be, for example a luma or chroma value or a colour value of a (R, G, B) format.

A pixel value is the value of a pixel of a screen. A pixel value may be represented by one sample for monochrome video picture and by multiple co-located samples for color video picture. Co-located samples associated with a pixel mean samples corresponding to the location of a pixel in the screen.

It is common to consider a video picture as being a set of pixel values, each pixel being represented by at least one sample.

A block of a video picture is a set of samples of one component of the video picture. A block of at least one luma sample or a block of at least one chroma sample may be considered when the picture/video format is the well-known (Y,Cb,Cr) format, or a block of at least one color sample when the picture/video format is the well-known (R, G, B) format.

The at least one exemplary embodiment is not limited to a particular picture/video format.

Generally speaking, the present application relates to encoding a video picture into a bitstream of encoded video picture data and to decoding such a bitstream of encoded video picture data. In particular, the present application involves converting a picture area of a video picture as part of a pre-processing prior to encoding, whereby a combination of at least one flipping operation and at least one rotation operation is applied to said picture area. In other words, a concept of the present application resides on applying a conversion involving flipping and rotation at the picture area level (i.e., on the whole video picture or on a picture area thereof) prior to encoding into a bitstream of encoded video picture data. Such a bitstream can then be decoded by applying a deconversion (or unconversion) at the picture area level, i.e., by applying a conversion inverse to the one previously performed at the encoding stage, so as to reconstruct the video picture.

Conversion of a picture area according to the present invention may be performed as part of a pre-processing prior to encoding a video picture, for instance before (and thus outside) the encoding loop. Alternatively, or cumulatively, this conversion may be performed as a preamble stage within the encoding loop.

As will be apparent from the embodiments described further below, candidate conversions may be applied during a first (fast) pass of the encoding loop. This first pass may be such that most coding tools (e.g. template based tools—like ITMP, TIMD . . . —and in-loop filter—like deblocking, ALF, SAO . . . ) are disabled and the partitioning is constrained (in depth splitting and partitioning modes) in order to rapidly select the best candidate conversion mode. Then, the actual encoding with the selected conversion mode may be performed in a second pass of the encoding loop.

As described further below, the present invention thus provides greater flexibility and adaptability in the process of encoding and decoding a video picture by allowing selection of a conversion mode (hybrid type) which defines a combination of at least one flipping operation and at least one rotation operation.

Other aspects and advantages of the present application will be described below in particular exemplary embodiments, with reference to the figures.

Figure 2:
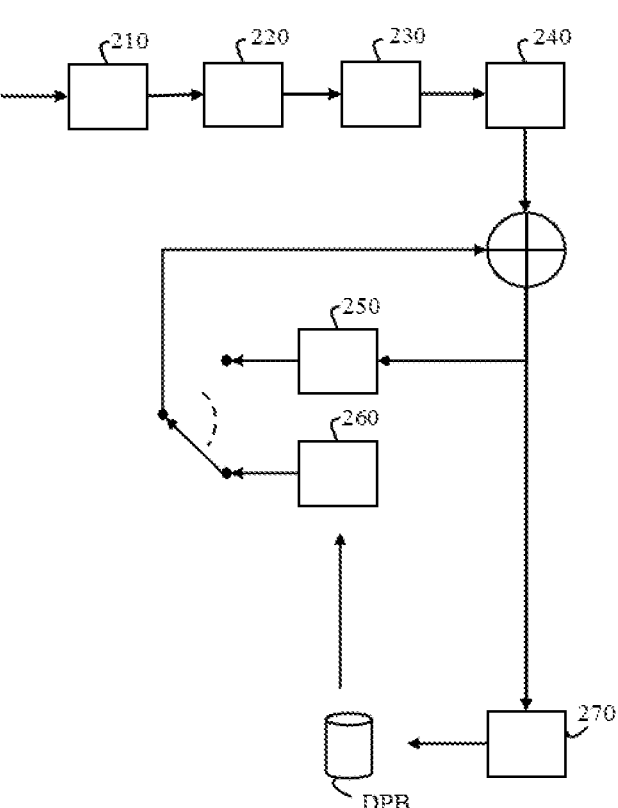
FIG. 2 shows a schematic block diagram of steps of a method 200 of decoding a video picture VP in accordance with prior art.

FIGS. 1 and 2 provides an overview of video encoding/decoding methods used in current video standard compression systems like VVC for example.

FIG. 1 shows a schematic block diagram of steps of a method 100 of encoding a video picture VP in accordance with prior art.

In step 110, a video picture VP is partitioned into blocks of samples and partitioning information data is signaled into a bitstream. Each block comprises samples of one component of the video picture VP. The blocks thus comprise samples of each component defining the video picture VP.

For example, in an HEVC, a picture is divided into Coding Tree Units (CTU). Each CTU may be further subdivided using a quad-tree division, where each leaf of the quad-tree is denoted a Coding Unit (CU). The partitioning information data may then comprise data defining the CTUs and the quad-tree subdivision of each CTU.

Each block of samples (CU), in short a block, is then encoded within an encoding loop using either an intra or inter prediction coding mode. The qualification "in loop" may also be assigned hereinafter to steps, functions or the like which are implemented within a loop, i.e. an encoding loop at the encoding stage or a decoding loop at the decoding stage.

Intra prediction (step 120) consists in predicting a current block by means of a predicted block based on already encoded, decoded and reconstructed samples located around the current block within the picture, typically on the top and on the left of the current block. Intra prediction is performed in the spatial domain.

In inter prediction mode, motion estimation (step 130) and motion compensation (135) are performed. Motion estimation searches, in one or more reference video picture(s) used to predictively encode the current video picture, a candidate reference block that is a good predictor of the current block. For instance, a good predictor of the current block is a predictor which is similar to the current block. The output of the motion estimation step 130 is one or more motion vectors and reference picture index (or indices) associated to the current block. Next, motion compensation (step 135) obtains a predicted block by means of the motion vector(s) and reference picture index (indices) determined by the motion estimation step 130.

Basically, the block belonging to a selected reference picture and pointed to by a motion vector may be used as the predicted block of the current block. Furthermore, since motion vectors are expressed in fractions of integer pixel positions (which is known as sub-pel accuracy motion vector representation), motion compensation generally involves a spatial interpolation of some reconstructed samples of the reference picture to compute the predicted block samples.

Prediction information data is signaled in the bitstream. The prediction information may comprise a prediction mode, prediction information coding mode, intra prediction mode or motions vector(s) and reference picture index (or indices) and any other information used for obtaining a same predicted block at the decoding side.

The method 100 selects one of the intra mode or inter coding mode by optimizing a rate-distortion trade-off taking into account the encoding of a prediction residual block calculated, for example, by subtracting a candidate predicted block from the current block, and the signaling of prediction information data required for determining said candidate predicted block at the decoding side.

Usually, the best prediction mode is given as being the prediction mode of a best coding mode p*for a current block given by:

$$p^* = \underset{p \in P}{\mathrm{Argmin}}\{RD_{cost}(p)\} \qquad (1)$$

Where P is the set of all candidate coding modes for the current block, p represents a candidate coding mode in that set, $RD_{cost}(p)$ is a rate-distortion cost of candidate coding mode p, typically expressed as:

$$RD_{cost(p)} = D(p) + \lambda R(p).$$

D(p) is the distortion between the current block and a reconstructed block obtained after encoding/decoding the current block with the candidate coding modep, R(p) is a rate cost associated with the coding of the current block with coding mode p, and λ is the Lagrange parameter representing the rate constraint for coding the current block and typically computed from a quantization parameter used for encoding the current block.

The current block is usually encoded from a prediction residual block PR. More precisely, a prediction residual block PR is calculated, for example, by subtracting the best predicted block from the current block. The prediction residual block PR is then transformed (step 140) by using, for example, a DCT (discrete cosine transform) or DST (Discrete Sinus transform) type transform or any other appropriate transform, and the obtained transformed coefficient block is quantized (step 150).

In variant, the method 100 may also skip the transform step 140 and apply quantization (step 150) directly to the prediction residual block PR, according to the so-called transform-skip coding mode.

Quantized transform coefficient block (or quantized prediction residual block) is entropy encoded into the bitstream (step 160).

Next, the quantized transform coefficient block (or the quantized residual block) is de-quantized (step 170) and inverse transformed (180) (or not) as part of the encoding loop, leading to a decoded prediction residual block. The decoded prediction residual block and the predicted block are then combined, typically summed, which provides the reconstructed block.

Other information data may also be entropy encoded in step 160 for encoding a current block of the video picture VP.

In-loop filters (step 190) may be applied to a reconstructed picture (comprising reconstructed blocks) to reduce compression artefacts. Loop filters may apply after all picture blocks are reconstructed. For instance, they consist in deblocking filter, Sample Adaptive Offset (SAO) or adaptive loop filter.

The reconstructed blocks or the filtered reconstructed blocks form a reference picture that may be stored into a decoded picture buffer (DPB) so that it can be used as a reference picture for the encoding of a next current block of the video picture VP, or of a next vide picture to encode.

FIG. 2 shows a schematic block diagram of steps of a method 200 of decoding a video picture VP in accordance with prior art.

In step 210, partitioning Information data, prediction information data and quantized transform coefficient block (or quantized residual block) are obtained by entropy decoding a bitstream of encoded video picture data. For instance, this bitstream has been generated in accordance with the method 100.

Other information data may also be entropy decoded from the bitstream for decoding a current block of the video picture VP.

In step 220, a reconstructed picture is divided into current blocks based on the partitioning information. Each current block is entropy decoded from the bitstream within a decoding loop. Each decoded current block is either a quantized transform coefficient block or quantized prediction residual block.

In step 230, the current block is de-quantized and possibly inverse transformed (step 240), to obtain a decoded prediction residual block.

On the other hand, the prediction information data is used to predict the current block. A predicted block is obtained through its intra prediction (step 250) or its motion-compensated temporal prediction (step 260). The prediction process performed at the decoding side is identical to that of the encoding side.

Next, the decoded prediction residual block and the predicted block are then combined, typically summed, which provides a reconstructed block.

In step 270, in-loop filters may apply to a reconstructed picture (comprising reconstructed blocks) and the reconstructed blocks or the filtered reconstructed blocks form a reference picture that may be stored into a decoded picture buffer (DPB) as above discussed (FIG. 1).

Particular exemplary embodiments of the present application will now be described with reference to FIGS. 3-16, making when applicable references to steps of features as previously described above (FIGS. 1-2). It should be noted however that the present application does not limit to the particular encoding and decoding examples of FIGS. 1 and 2 and may apply to other encoding and decoding exemplary embodiments.

The present application provides encoding and decoding methods for encoding and decoding a video picture. In the following exemplary embodiments, encoding and decoding of a video picture is described. It should be appreciated, however, that the present application may apply to a plurality of video pictures, for instance video pictures of a stream of video data.

In the following exemplary embodiments, it is considered that the video picture being encoded and decoded is defined by picture components. It should be appreciated, however, that the nature and number of components comprised in the considered video picture may vary depending on the case (depending for instance on the picture/video format specifying the video picture), the present application applying more generally to a video picture comprising at least one component. In the exemplary embodiments described below, the video picture being processed is a color video picture. In a first example, the picture component corresponds respectively to a luma (or luminance) component and two chroma (or chrominance) components (for instance in the well-known format (Y, Cb, Cr)). In a second example, the picture components correspond to three color components, such as Red, Green and Blue for instance. In a variant, the video picture at hand is a monochrome video picture comprising a single picture component.

As mentioned earlier, the encoding and decoding methods of the present application involve respectively converting and de-converting (or unconverting) a picture area of a video picture (a 2D video picture) by applying to said picture area at least one of a flipping operation and/or a rotation operation. This way, each picture area of a video picture may be independently converted and deconverted according to a respective conversion mode. Converting a picture area means that either a flipping operation, or a rotation operation, or both, are applied to the picture area. Likewise, de-converting the picture area means that an inverse conversion is applied to the picture area so as to convert back the picture area to its original state prior to the conversion, De-converting is thus performed by performing a flipping and/or a rotation operation(s) which are inverse to the one(s) performed at the conversion stage. For instance, if a picture area is converted by applying thereto a horizontal flipping operation, the converted picture component can be deconverted by applying thereto a horizontal flipping operation once again. In another example, a component converted by a clockwise 90° rotation can be deconverted by applying thereto an anti-clockwise 90° rotation.

As described further below, converting and de-converting a picture area of a video picture may be performed according to a conversion mode which defines a combination of at least one flipping operation and at least one rotation operation to achieve encoding and decoding, respectively. In other words, converting a picture area may be achieved by applying one or more flipping operations and one or more rotation operations, in any order, to the picture area at hand. Likewise, de-converting may be achieved by applying to the picture area an inverse conversion so as to convert back the picture area to its original state prior to the conversion. De-converting is thus performed by performing a conversion, i.e., an operation combining flipping and rotation, which is inverse to the conversion performed at the conversion stage. For instance, if a picture area is converted by applying thereto a horizontal flipping operation followed by a 90° clockwise rotation, the converted picture area can then be deconverted by applying thereto a 90° anticlockwise rotation followed by a horizontal flipping operation.

In the present document, applying a flipping operation and/or a rotation operation to a picture area means that each picture component of said picture area are subject to said operation(s). Likewise, the conversion or de-conversion of a picture area means that the same flipping and/or rotation operation(s) is applied to each picture component of said picture area. If, for instance, a combination of at least one flipping operation and at least one rotation operation is applied to a picture area, each picture component thereof is subject to said combination.

Figure 3:
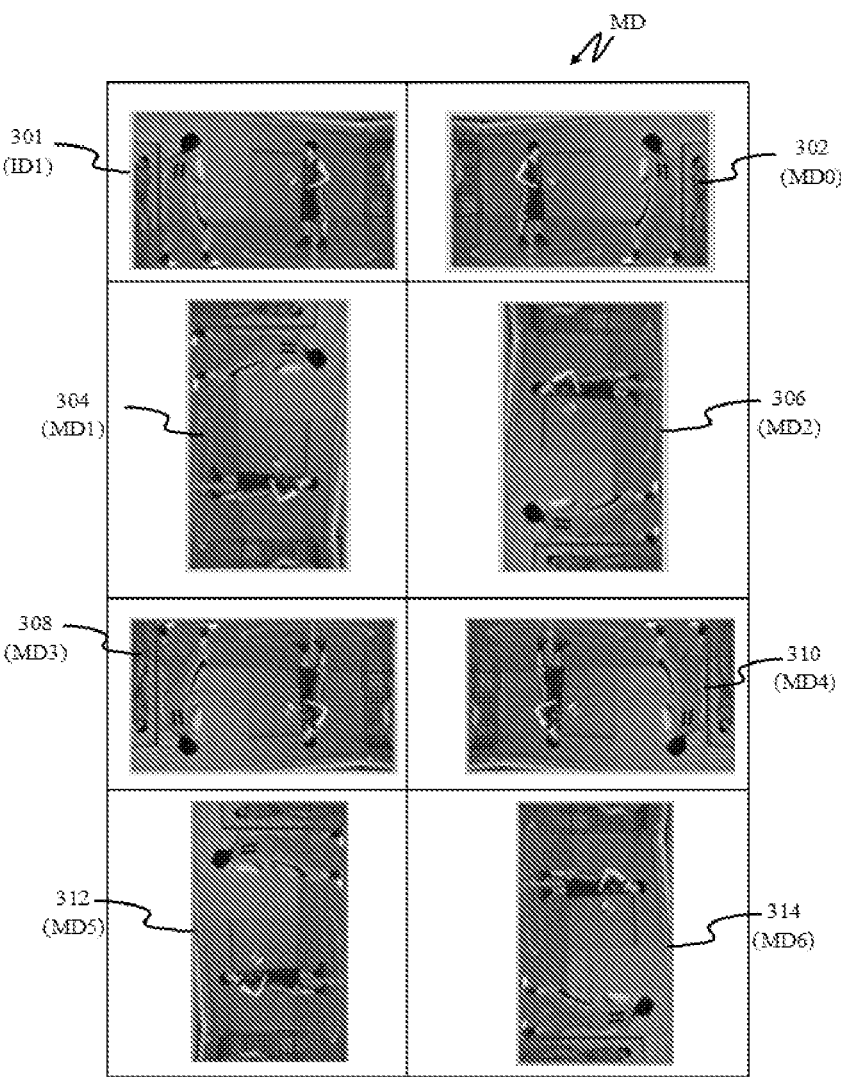
FIG. 3 illustrates various conversion modes according to at least one particular exemplary embodiment of the present application.

Various flipping and rotation operations may be contemplated for converting and de-converting a picture area of a video picture. FIG. 3 shows exemplary conversion modes MD0-MD6 (noted collectively MD) according to which a picture area (and more particularly components thereof) may be converted. Each conversion mode MD defines at least one of a flipping operation and/or a rotation operation to be applied to a picture area. In other words, a conversion mode MD involves either only a flipping operation (i.e., one or more), or only a rotation operation (i.e., one or more), or a combination of a flipping operation and a rotation operation. A conversion thus means a flipping, a rotation or a combination of both. The order in which multiple flipping and/or rotation operations of a conversion are applied may have a direct effect on the result of the conversion at hand (in particular when the conversion involves a combination of flipping and rotation).

More specifically, FIG. 3 illustrates an identify function ID1 according to which an original picture video 301 remains unmodified. Applying the identify function ID1 to a particular picture area thus yields the same picture area, which can be appropriate in some cases.

Further, the first conversion mode MD0 corresponds to a horizontal flip applied to the video picture, to obtain for instance video picture 302 in this case. The second conversion mode MD1 corresponds to a 90° clockwise rotation to the video picture, to obtain for instance video picture 304 in this case. The third conversion mode MD2 corresponds to a 90° anti-clockwise rotation to the video picture, to obtain for instance video picture 306 in this case. The fourth conversion mode MD3 corresponds to a vertical flip (i.e., horizontal symmetry) to the video picture, to obtain for instance video picture 308 in this case. The fifth conversion mode MD4 corresponds to a horizontal flip (i.e., vertical symmetry) followed by a vertical flip applied to the video picture, to obtain for instance video picture 310 in this case. The sixth conversion mode MD5 corresponds to a vertical flip and a 90° clockwise rotation applied to the video picture, to obtain for instance video picture 312 in this case. The seventh conversion mode MD6 corresponds to a vertical flip followed by a 90° anti-clockwise rotation applied to the video picture, to obtain for instance video picture 314 in this case. In this particular example, any other combination of the above conversions is a duplicate (or equivalent) of these conversions. A picture area of the original video picture 301 may thus be converted by applying thereto any one of the conversion modes MD0-MD6.

As can be seen, the conversion mode MD1 for instance is Inverse to the conversion mode MD4.

The above examples of conversion modes MD are however not limitative, other variants may be contemplated. The nature and number of conversion modes implemented in the present application may be adapted on a case-by-case basis.

Adopting for instance a syntax where "H" represents a horizontal flip, "R" represents a 90° (clockwise) rotation and, "+" represents a next/following operation within a combination of operations, the above conversion modes MD0-MD6 may be defined as follows:

$$\text{conversion mode } MD0 = H,$$

$$\text{conversion mode } MD1 = R,$$

$$\text{conversion mode } MD2 = R + R + R(\text{or } H + R + H),$$

$$\text{conversion mode } MD3 = H + R + R,$$

$$\text{conversion mode } MD4 = R + R,$$

$$\text{conversion mode } MD5 = R + H, \text{ and}$$

$$\text{conversion mode } MD6 = H + R$$

As can be seen, it is not possible to achieve all the above conversion modes MD0-MD6 by applying only one or more rotation operations or by applying only one or more flipping operations.

Indeed, if using only rotation, one may only implement the following conversion modes MD:

$$MD1 = R,$$

$$MD2 = R + R + R(\text{or } 270° \text{ rotation})$$

$$MD4 = R + R(\text{or } 180° \text{ rotation})$$

When considering only rotation of a picture area, only conversion modes MD1 (rotation 90°), MD2 (rotation 270°) and MD4 (rotation 180°) can be implemented. It is noted that rotation 180° provides an identical result to the combination of horizontal and vertical flipping except that it induces a lower cost in terms of processing and obviates the need for a temporary buffer.

Further, if using only flipping, one may only implement the following conversion modes MD:

$$MD0 = H$$

$$MD3 = V$$

$$MD4 = H + V$$

When considering only flipping of a picture area, only conversion modes MD0 (horizontal flip), MD3 (vertical flip) and possibly MD4 (horizontal and vertical flips). It is noted that a combination of a 180° rotation provides an identical result to a combination of a horizontal flipping and a vertical flipping except that it induced a lower cost in terms of processing and obviates the need for a temporary buffer.

By applying a combination of at least one flipping operation and at least one rotation operation, it is thus possible to implement the following conversion modes:

$$MD5 = R + H$$

$$MD6 = H + R$$

Advantageously, the combination of flipping and rotation brings two specific conversion modes, also called "hybrid" conversion modes, which could not exist without the rotation and flipping synergy, namely: conversion modes MD5 (vertical flipping with 90 rotation or similarly horizontal flipping with 270° rotation) and MD6 (vertical flipping with 270° rotation or similarly horizontal flipping with 90° rotation), These additional conversion modes bring diversity in predictor candidates, thereby allowing for instance to deal efficiently with specific video content such as gaming content or vertical videos which are becoming mainstream.

The present invention thus provides greater flexibility and adaptability in the process of encoding and decoding a video picture by allowing selection of a conversion mode (hybrid type) which defines a combination of at least one flipping operation and at least one rotation operation. In the present exemplary embodiment, MD5 and MD6 are two hybrid conversion modes, involving flipping and rotation, which can be selected and applied at the encoding and decoding stage.

Considering for instance an implementer (e.g. embedded device) with sufficient processing power and memory to implement only horizontal flipping and 90° rotation. This would allow applying conversion modes MD0 and MD1 as well as conversion modes MD5 and MD6 (by combining flipping and rotation). Assuming enough power is available, the 90° rotation may be used several times in a row to generate a 180° or a 270° rotation. This way, all possible conversion modes MD0-MD6 can be generated from a combination of only one rotation and one flipping as base mode implementations (horizontal flip and 90° rotation).

Considering in another example an implementer with sufficient memory on a system but low processing power or latency constraints, one may prefer to implement several conversion modes minimizing the number of operations. For instance, implementing a 180° rotation saves one processing operation for conversion mode MD4 compared to a combination of a horizontal flipping and a vertical flipping. Likewise, conversion modes MD5 and MD6 can be directly implemented as a one operation, thereby saving processing cost.

The above examples show that competition between various conversion modes MD can provide compression coding gains by considering a wider representation of content diversity so that content principal directions may be aligned with codec preferred one. In particular, significant compression coding gains can be achieved by using a set of conversion modes MD including at least one hybrid conversion mode defining a combination of at least one flipping operation and at least one rotation operation. As explained above, such a combination brings flexibility and more efficiency into the processing of encoding and decoding a video picture.

The present invention thus allows encoding/decoding a picture area of a 2D video picture with great efficiency. It should be noted that rotation in 2D video coding is not a mainstream technique as 2D video codecs are biased towards horizontally dominant natural structures. This bias is due to gravity horizontal stacking effect on structures layout (the same rationale why most animal eyes are likely aligned horizontally). The present application overcomes this bias by combining flipping and rotation into a same conversion mode that can be applied to a picture area for the purpose of encoding and decoding.

In the following examples, it is considered that each rotation operation is a rotation, clockwise or anti-clockwise, according to any one of the following rotation angles: 90°, 180° and 270° (multiple of 90°). However, other implementations are possible where rotations at an angle other than 90°, 180° and 270° are performed for conversion and de-conversion purposes.

In the exemplary embodiments described further below, it is considered that the conversion modes MD0-MD6 form together a set of conversion modes in which selection can be made to convert and de-convert each picture area of a video picture. Other exemplary embodiments are however possible where any sub-set of conversion modes MD0-MD6 is used.

In a particular exemplary embodiment, the set of conversion modes MD in which selection can be made to convert and de-convert a picture area includes at least one hybrid conversion mode, i.e., at least one conversion mode MD (e.g. MD5 and/or MD6) which defines a combination of at least flipping operation and at least one rotation operation. By way of an example, the set of conversion modes MD comprises MD0-MD6 as previously described.

In a particular example, selection can be made among a set of options comprising at least one hybrid conversion mode and the identify function. Selection can be made, for instance, among the identity function ID1 and the conversion modes MD0-MD6.

It should be appreciated that, when converting and de-converting a video picture in the present application, conversion and de-conversion may be applied to the entire video picture or may be applied separately to one or more picture areas of the video picture. Each picture area of a video picture may thus be encoded and decoded in an analogous manner by applying a conversion and de-conversion to the picture area at hand.

As described further below, de-converting a picture component during decoding means that a conversion, inverse to the conversion performed for encoding, is performed to the picture area. Accordingly, a de-conversion can be made according to an appropriate conversion mode among the set of conversion modes MD0-MD6 or among any subset thereof.

The present application proposes to convert at least one picture area of a video picture as a pre-processing prior to encoding, which means that the conversion is performed out of the encoding loop (see FIG. 1), Likewise, the at least one picture area of the encoded video picture may be de-converted as a pre-processing prior to decoding, i.e., out of the decoding loop (see FIG. 2). Therefore, the encoding and decoding methods of the present application are codec-agnostic. In the following exemplary embodiments, the codec used may thus be any one of VVC, HEVC, AV1, etc.

Figure 4:
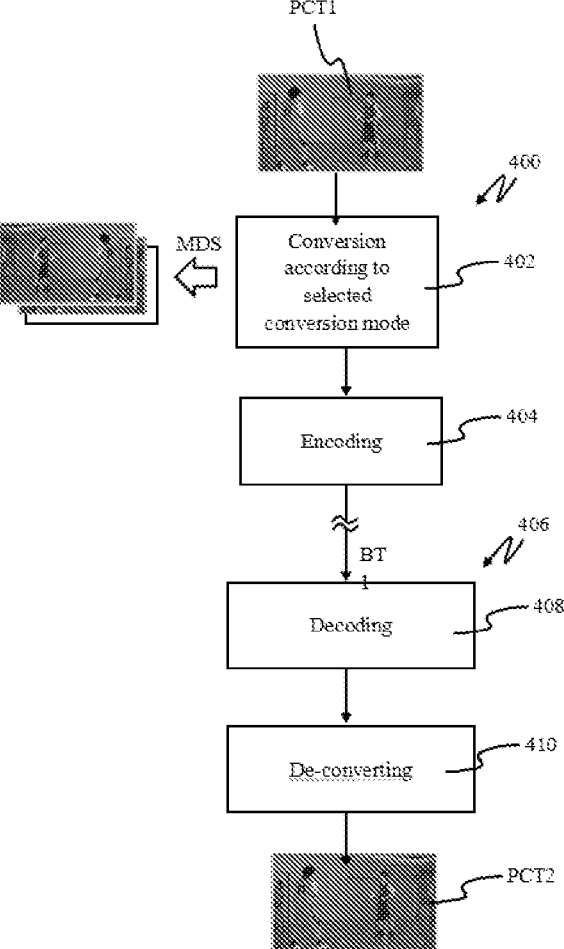
FIG. 4 shows an encoding method and a decoding method according to particular exemplary embodiments of the present application.

FIG. 4 shows a schematic block diagram of steps 402-404 of an encoding method 400 for encoding a video picture VP and steps 408-410 of a decoding method 406 for decoding a video picture from a bitstream of encoded video picture data, according to a particular exemplary embodiment. This figure represents the general concepts of encoding and decoding of the present application, in particular exemplary embodiments.

As shown in FIG. 4, a video picture PCT1 is obtained as input for encoding in the encoding method 400. As indicated earlier, it is considered at present that the picture video PCT1 is a color video picture defined by 3 picture components.

In a conversion step 402, at least one picture area of the picture image PCT1 is converted, based on a conversion mode MD, into at least one converted picture area. Accordingly, each picture component of the at least one converted picture area is converted based on the same conversion mode MD. The conversion mode MD—noted MDS—used in conversion step 402 is of the hybrid type, i.e, it defines a combination of at least one flipping operation and at least one rotation operation. In a particular example, the conversion mode MD combines one flipping operation and one rotation operation. The selected conversion mode MDS is for instance the conversion mode MD5 or MD6 as previously described.

This picture area encoded in FIG. 4 may represent the totality of the video picture PCT1 or only a sub-portion thereof. In the latter case, an analogous processing can be performed to encode and decode each picture area of the video picture PCT1, For a matter of simplicity, encoding and decoding of a picture area is described in the following examples where this picture area constitutes the totality of the video picture PCT1.

In a particular exemplary embodiment, a selection of a conversion mode MD can be made for the video picture PCT1, for instance among the set of conversion modes MD0-MD6. Each picture component of the video picture PCT1 is thus converted according to the selected conversion mode noted MDS. According to a particular embodiment, the selected conversion mode MDS defines a combination of at least one flipping operation and at least one rotation operation to video picture PCT1. The way such a selection may be performed will be described later in particular exemplary embodiments.

The components of the converted video picture are then encoded (step 404) into a bitstream BT1 of encoded video picture data. The method of encoding may be adapted depending on each case. It is considered for instance that entropy encoding is performed as described earlier with reference to FIG. 1.

Further, the decoding method 406 obtains as input the bitstream BT1 of encoded video picture data output by the encoding method 400. In a decoding step 408, a decoded video picture is obtained by decoding the encoded video picture data from the bitstream BT1. The way decoding is performed may be adapted depending on each case. It is considered for instance that entropy decoding is performed as described earlier with reference to FIG. 2.

In a de-conversion (or un-conversion) step 410, the video picture PCT1 (i.e., a reconstructed version of the video picture PCT1) is obtained by de-converting, according to a conversion mode MD, the decoded video picture obtained from decoding step 408. As described further below, the conversion mode MD used for de-converting the decoded video picture is a conversion mode inverse to the selected conversion mode MDS previously used in the encoding method 400 (encoding step 402) to convert the video picture PCT1. By de-converting the decoded video picture (I.e., each picture component thereof) according to a conversion mode inverse to MDS, the reconstructed video picture PCT2 can be obtained.

Figure 5A:
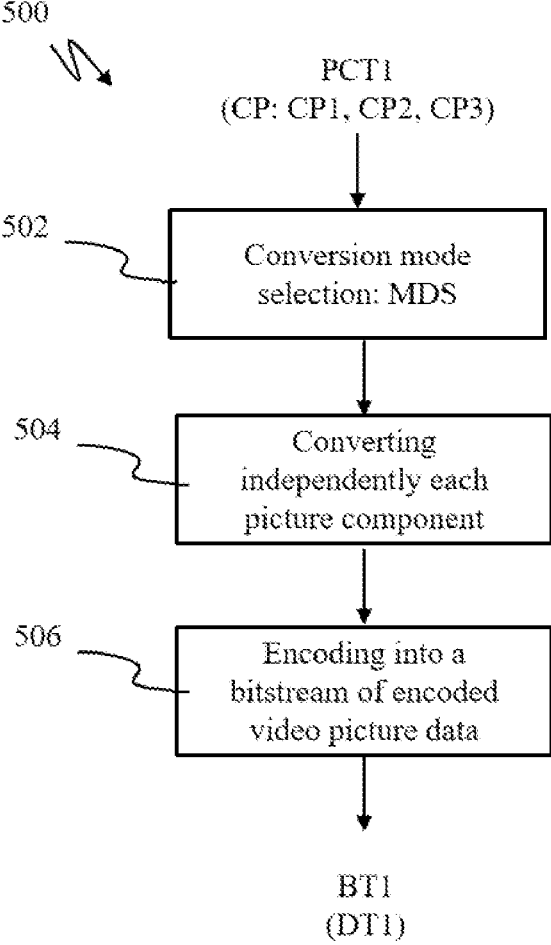
FIGS. 5A and 5B show an encoding method according to particular exemplary embodiments of the present application.

FIG. 5A shows a schematic block diagram of steps of an encoding method 500 for encoding a video picture PCT1 comprising at least one picture area defined by 3 picture components CP1, CP2 and CP3, according to a particular exemplary embodiment.

In a selecting step 502, a conversion mode MD is selected, wherein the selected conversion mode (noted MDS) defines a combination of at least one flipping operation and at least one rotation operation, this combination of operations being applied to a picture area PCT1. The selected conversion mode MDS may be for instance conversion mode MD5 or MD6 as previously described with reference to FIG. 3.

In a converting step 504, the picture area PCT1 is converted, based on the selected conversion mode MDS, into a converted picture component. To this end, each picture component of the picture area PCT1 is converted according to the selected conversion mode MDS.

Figure 5B:
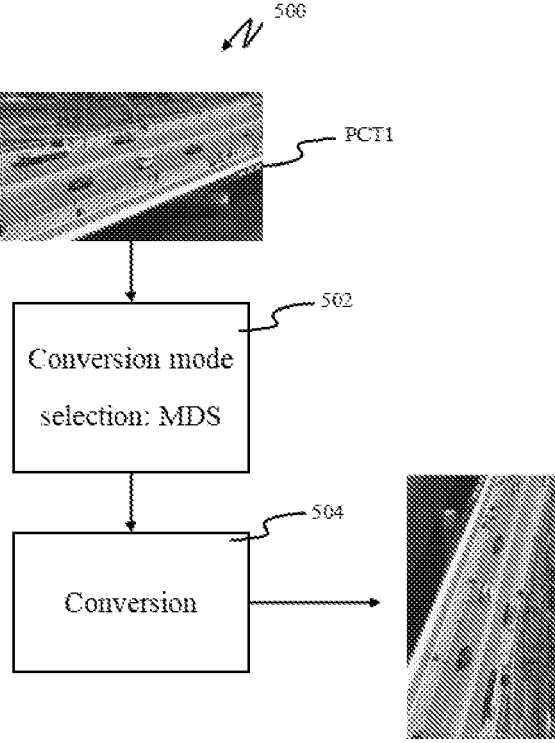

An exemplary implementation of steps 502 and 504 is shown in FIG. 5B, where the selected conversion mode MDS is MD6 as previously described, Decision on the selected conversion mode MDS is made at the level of the picture area. Accordingly, each picture area of a video picture may be converted based on a respective conversion mode MDS selected in selection step 502.

In an encoding step 506 (FIG. 5A), the converted picture area (I.e., each converted picture component thereof) is encoded into a bitstream BT1 of encoded video picture data. Encoding may thus be performed on a gathering of converted components.

The present application thus allows reorganizing, at the encoding stage, the order of the samples of each picture within the bitstream of encoded video picture data. The original order of the samples in a picture area can be modified or adapted, thereby allowing more flexibility and efficiency to be achieved during encoding. More especially, by applying a combination of at least one flipping operation and at least one rotation operation with decision at the picture area level, greater flexibility and adaptability in the process of encoding and decoding a video picture can be achieved. As explained earlier, competition between various conversion modes can provide compression coding gains by considering a wider representation of content diversity so that content principal directions may be aligned with codec preferred one, By applying both flipping and rotation, it is possible to bring new conversion modes which could not exist otherwise. These new, hybrid, conversion modes may be particularly adapted in some cases, notably for the purpose of encoding/decoding with efficiency specific video content such as gaming content or vertical videos which are becoming mainstream.

Likewise, flexibility and efficiency can be achieved in an analogous manner at the decoding stage. Pre-processing of the image to be encoded allows to limit power consumption and encoding time.

In a particular exemplary embodiment, the encoding method 500 further comprises a step of signaling (or inserting), into the bitstream BT1 of encoded video picture data, area conversion information DT1 indicating if at least one picture area of the video picture PCT1 is converted according to a conversion mode MD. In the present case, the area conversion information DT1 thus indicates that at least one picture area of the video picture PCT1 has been converted according to a conversion mode MD. The format and way this information is carried into the bitstream BT1 may be adapted on a case-by-case basis. For instance, the area conversion information DT1 may comprise a bit or an indicator which is either at a first value to indicate that no picture area conversion has been made or at a second different value to indicate that at least one picture area conversion has been made.

In a particular exemplary embodiment, the area conversion information DT1 is carried in the bitstream BT1, as a header, or a parameter, or an SEI (supplemental enhancement information) message within said bitstream.

In a particular exemplary embodiment, the area conversion information DT1 further defines at least one conversion mode MDS selected for converting at least picture area of the video picture PCT1. For instance, the area conversion information DT1 may define the selected conversion modes MD5 or MD6 in association with a particular picture area (see FIG. 4).

As described further below, de-converting of video picture data at the decoding stage may be performed based on the area conversion information DT1 signaled within the bitstream BT1. In other variants, the area conversion Information DT1 is not signaled within the bitstream BT1 but this information is obtained by any other appropriate means during decoding (for instance by transmitting the applied conversion mode(s) MDS from an encoder to a decoder).

Figure 6:
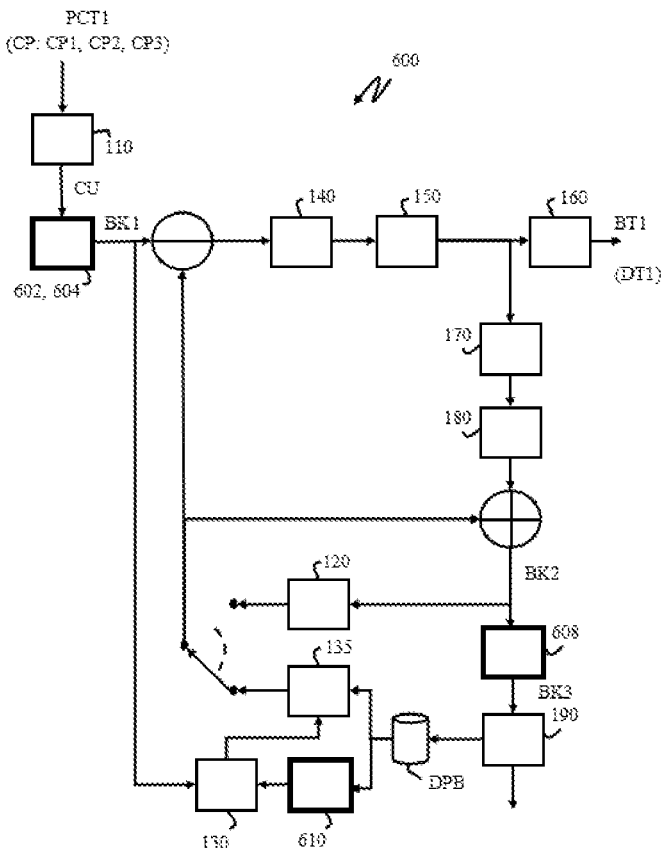
FIG. 6 shows an encoding method according to at least one particular exemplary embodiment of the present application.

FIG. 6 shows a schematic block diagram of steps of an encoding method 600 for encoding a video picture PCT1 comprising at least one picture area defined by 3 picture components CP1, CP2 and CP3 (referenced collectively as CP), according to a particular exemplary embodiment. This exemplary embodiment may correspond to an exemplary implementation of the encoding method 500 (FIG. 5A). As can be seen, the encoding method 600 comprises steps already described with reference to FIG. 1 and will thus not be described again in details for a matter of conciseness.

Encoding of a picture area corresponding to the totality of the video picture PCT1 is considered hereafter for a matter of simplicity, although variants are possible where one or more pictures areas corresponding to sub-portions of the video picture PCT1 are encoded in an analogous manner.

As already described, in partitioning step 110, the video picture PCT1 is partitioned into blocks of samples and partitioning information data is signaled into a bitstream. The blocks comprise samples of each component CP defining the video picture PCT1. These blocks may for instance correspond to CTUs, or subdivisions of CTUs, i.e., CUs as shown in FIG. 6.

Each block of samples is received as Input in selecting step 602. Selection (step 602) of a conversion mode MD, noted MDS, is made for the video picture PCT1, for instance among conversion modes MD0-MD6 as described earlier for selecting step 502 (FIG. 5A).

The video picture PCT1 is then converted (step 604) based on the selected conversion mode MDS, for instance as described earlier for converting step 504 (FIG. 5A). This selected conversion mode MDS defines a combination of at least one flipping operation and at least one rotation operation. Each picture component CP of the video picture PCT1 is thus converted according to the same conversion mode, namely the selected conversion mode MDS. In this example, the converted picture components CP are output as blocks BK1.

Encoding of the video picture PCT1 is then performed by processing each current block in an encoding loop, this loop including steps as described earlier with reference to FIG. 1. An iteration of the encoding loop for encoding a current block is described below, analogous steps being performed at each iteration for processing each current block BK1 successively.

More particularly, the encoding loop receives (FIG. 5A) as a current block BK1 a converted picture component CP obtained in converting step 604. In this encoding loop, steps 140-180 are performed as already described. In particular, a prediction residual block is calculated based on the current block BK1 and a predicted block for said current block BK1.

In encoding step 160, the converted picture component CP of the current block is encoded into a bitstream BT1 of encoded video picture data. For instance, a quantized transform coefficient block (or quantized prediction residual block) obtained in step 150 based on the prediction residual block is entropy encoded into the bitstream BT1. By processing successively in the same manner each current block BK1, each converted picture component CP of the video picture PCT1 can be encoded into the bitstream BT1 of encoded video picture data.

Encoding step 160 may also comprise signaling component conversion information DT1 into the bitstream BT1 as previously described (FIG. 5A), although variants without such a signalization are also possible.

Further, steps 170-180 are performed, and the decoded prediction residual block and the predicted block are then combined, as described earlier with reference to FIG. 1, to obtain a reconstructed block noted BK2 (FIG. 6). As already explained, intra prediction (step 120) may be performed based on the reconstructed block BK2.

In a de-converting step 608, a de-converted block BK3 is obtained by de-converting the reconstructed block noted BK2 according to the conversion mode MDS selected in step 602 for said component CP. In other words, the component CP of the current block is de-converted according to the conversion mode MDS selected for said video picture PCT1.

In this manner, each component CP of the reconstructed video picture can be de-converted according to the same conversion mode MDS selected in step 602 for said video picture PCT1. De-conversion is achieved by applying to each component CP a conversion inverse (flipping and rotation) to the conversion MDS applied to said component CP in step 604, so as to obtain a de-converted block BK3 representative of the current block BK1 (with same orientation or state in terms of flipping and rotation).

Accordingly, in the de-converting step 608, the inverse flipping and rotation operations are performed, in the reverse order, compared to the combination of flipping and rotation operations defined by the selected conversion mode MDS.

In-loop filters, such as cross-components filters for instance, may then be applied (step 190) to the de-converted block BK3, and more generally to the de-converted picture (comprising de-converted reconstructed blocks BK3) to reduce compression artefacts, as already described (FIG. 1). In-loop filters may apply, for instance, after all picture blocks are reconstructed and de-converted, although variants are possible as later described. For instance, they consist in deblocking filter, Sample Adaptive Offset (SAO), Cross- Component SAO (CC-SAO), Adaptive Loop Filter (ALF). Variants are however possible without such in-loop filters.

In a particular exemplary embodiment, inter prediction can be achieved by performing motion estimation (step 130) and motion compensation (step 135) as already described. Further, the inter prediction mode includes an additional converting step 610 to obtain a good predictor block for a next block BK1 subsequent to the current block BK1, by converting the de-converted block BK3 output from de-converting step 608 (possibly after post-filtering 190) according to the selected conversion mode MDS. This new conversion allows building an adequate predictor block for the next current block processed in the encoding loop. This way, the motion estimation (step 130) is based on a reconstructed block which is in the same flipping/rotation state as the video picture in which a motion compensated block is searched.

As can be seen from the above exemplary embodiments, a conversion decision may be performed at the encoding stage of a video picture PCT1 to select an appropriate conversion mode MDS that is applied to the entire video picture PCT1 (or at least to a picture area of said video picture PCT1), By selecting the most appropriate conversion mode MDS, that is, an hybrid conversion mode that involves flipping and rotation, it is possible to achieve encoding flexibility and adaptability, and thus encoding efficiency with great compression gains. In particular, an optimal rate-distortion trade-off can be achieved.

In a particular exemplary embodiment, a rate-distortion score (or rate-distortion trade-off) achieved by encoding a video picture PCT1 (or at least a part thereof) is computed for a plurality of candidate conversion modes MD (e.g., conversion modes MD0-MD6) and the candidate conversion mode with the greatest rate-distortion score is selected as the selected conversion mode MDS for said picture component CP.

It has been observed in particular examples that the conversion modes MD0-MD2 (as shown in FIG. 3) are usually more appropriate for most natural content (non-screen content).

In-depth analysis of encoded video pictures with best rate-distortion trade-off has allowed to better understand the rationales for the compression gains achieved with selected conversion modes.

Figure 7:
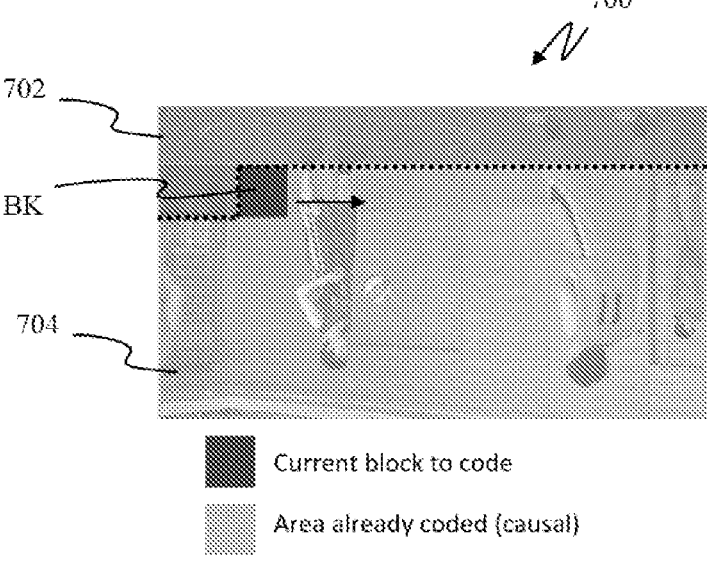
FIG. 7 illustrates scanning of blocks of at least one picture component, according to a particular exemplary embodiment of the present application.

As already described, each block of a video picture to be encoded is scanned according to a scanning order that may be adapted for each case. As illustrated in the example of FIG. 7, conventional video codecs use raster scan to scan successively each block or slice in video picture data. This leads to creating a causal area in the video picture (I.e., area of content already coded or decoded, and known for the current block to be coded at the decoder) wherein reference samples used for prediction and other predictions have more accuracy.

It has been observed that higher encoding efficiency can be achieved for picture content containing directional characteristics extending along particular directions, typically the direction from top-left border to right-bottom of the picture when a raster scan is used for block scanning. This results from the specific L-shape and causal area of the picture content due to raster scan. Reference sample used for prediction gives rise to higher encoding accuracy (as being spatially closer) in the top, left and top-left area of the current block compared with the area in the top-right portion of the video picture. Besides, some samples are not yet encoded and cannot be used for prediction (right, bottom-right, bottom, etc.) of the current block, but some picture content may benefit from such samples for prediction.

Figure 8:
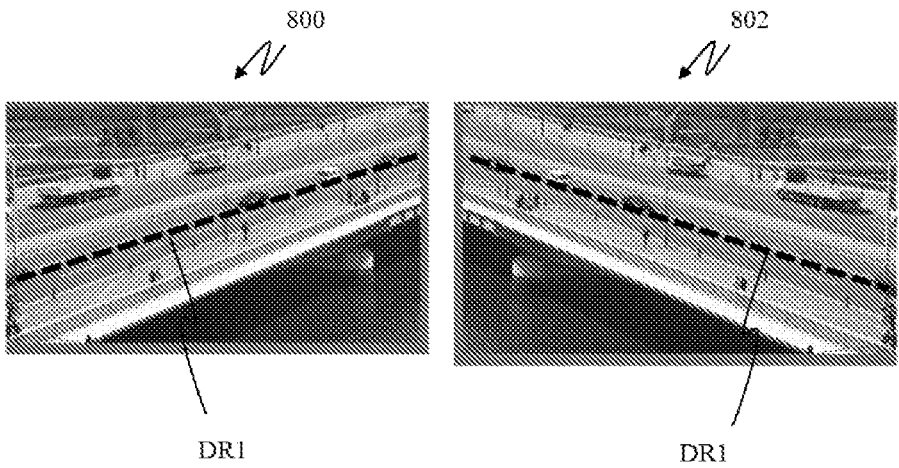
FIG. 8 illustrates main directions in a component of a video picture, according to a particular exemplary embodiment of the present application.

FIG. 8 shows an exemplary video picture 800 comprising a main direction DR1, that is, a direction along which extend one or several picture components CP of the video picture 800. In the present example, the main direction (or main orientation) DR1 represents the general direction of features (e.g., markings, road, bridge, etc.), so-called directional features, in the sense that they generally extend along the main direction DR1, FIG. 8 also shows an example of a converted video picture 802 obtained for instance by applying conversion to the video picture 800 (i.e, to the picture components thereof) according to a conversion mode MD, that is, horizontal flipping in that particular case (conversion mode MD1 in FIG. 3). As can be seen, the main direction DR1 Is converted as part of all the features of the converted picture component(s). Horizontal flipping leads to a rotation of the main direction DR1 which now substantially extends from the top-left area to the bottom-right area of the video picture. Such an orientation in the horizontally-flipped video picture 802 provides better encoding efficiency when raster scan is used.

It has been observed for instance that encoding BQ Terrace sequence, exhibiting strong directions, with a horizontal flipping as previously described, permits after conversion a gain of up to 2% BD-rate against ECM (Enhanced Compression test Model).

Inversely, it has been observed that encoding picture content with main directions orthogonal to the reference sample positions are not prone to leverage compression gains.

Figure 9:
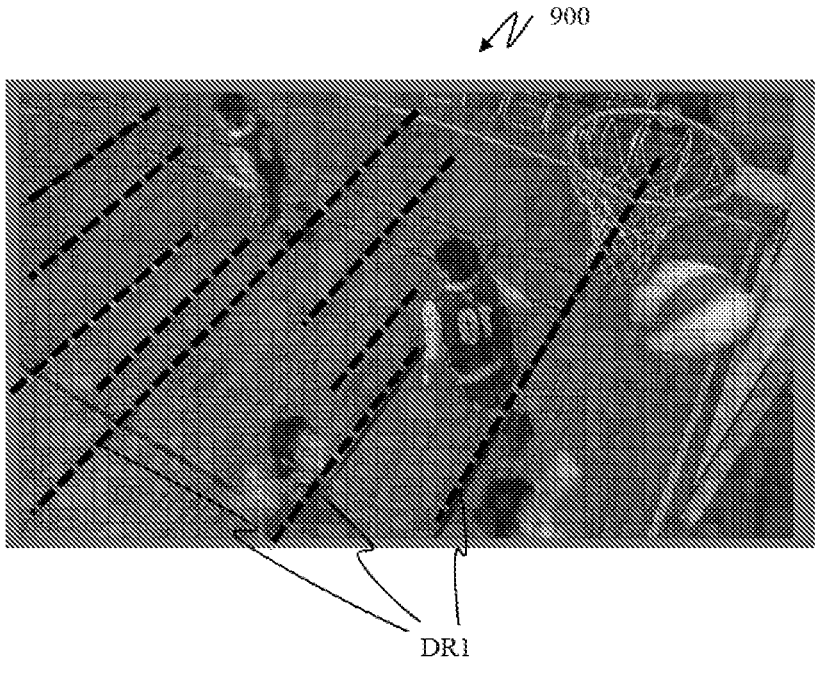
FIG. 9 illustrates main directions in a component of a video picture, according to a particular exemplary embodiment of the present application.

As illustrated in FIG. 9 which has been horizontally flipped compared to the original picture, it may happen in some cases that the picture content comprises directional features which extend in (or substantially in) the orthogonal direction DR1 (e.g. top-right to bottom-left diagonal). In such cases, applying the identity function (I.e., no conversion operated) to the picture area at hand may allow to reach the best encoding results.

As can be understood from above, the most appropriate conversion mode for encoding a given video picture depends on the scanning order used for encoding as well as at least one direction along which may extend features of the video picture. The selected conversion mode MDS for a picture area may thus be determined in selecting step 502 (FIG. 5A) based on at least one of the two above criteria.

In a particular exemplary embodiment, a picture area of a video picture PCT1 to be encoded contains a main direction DR1 and the conversion mode MDS selected for said picture area is the conversion mode MD with the converted main direction, obtained by converting the main direction DR1 according to said conversion mode, the most aligned with a target direction DR0, also denoted prediction direction (e.g., a desired direction extending generally from the top-left area to the bottom-right area of the video picture). The target (or predefined) direction DR0 may be adapted depending on each case and may be determined, for instance, as a function of the scanning order to maximize compression gain during encoding.

As can be understood, the presence of a main direction along which directional features extend in a given picture area of a video picture to be encoded may have a strong impact on the encoding efficiency associated with a selected conversion mode. Encoding may thus benefit from a pre-analysis of the picture content to determine potential main direction(s) in a picture component CP. Based on the main direction(s) determined in the pre-analysis, conversion mode(s) of Interest may be selected to enhance compression gains. For Instance, one will preferably align main direction(s) present in the picture content with a target direction DR0, for instance a top-left to bottom-right diagonal of the picture content.

In a particular example, a video picture is split into picture areas per main direction detected in the video picture, so that a respective conversion mode MDS can be selected for each picture area. In that particular case, the in-loop reconstructed picture is de-converted (or the motion compensated block converted to the appropriate MDS mode) so that the motion estimation and motion compensation operate on blocks converted in the same MDS mode.

In a particular exemplary embodiment, a conversion mode MDS is selected for a picture area of a video picture PCT1 from a list of candidate conversion modes MD. This list may be obtained by obtaining a at least partially converted picture by converting at least part of the picture area with a candidate conversion mode MD, and by adding the candidate conversion mode MD to a list of candidate conversion modes when (if) a distance between a main direction DR1 determined from the at least partially converted picture area and a target direction DR0 of the picture area is lower than a threshold. Particular examples of Implementation are described further below.

Figure 10:
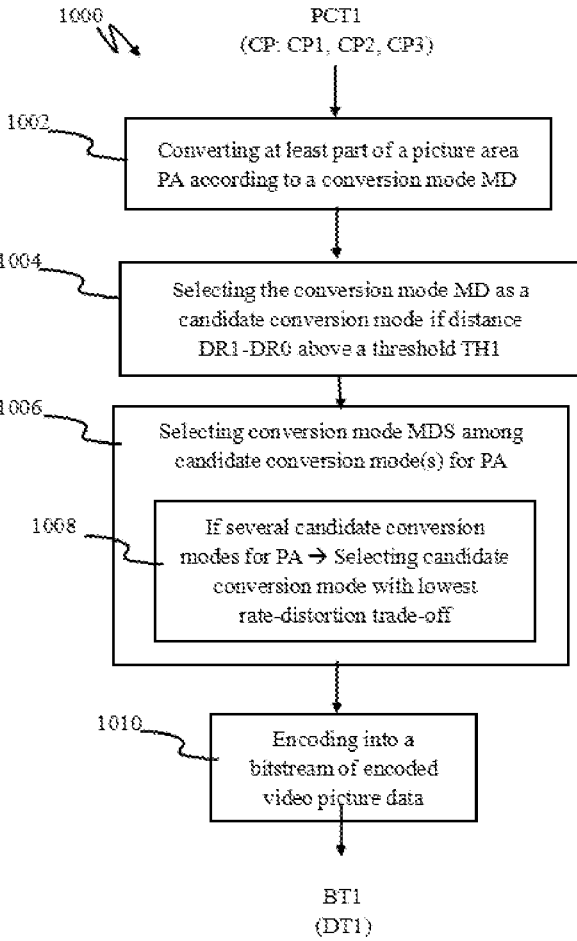
FIG. 10 shows an encoding method according to at least one particular exemplary embodiment of the present application.

FIG. 10 shows a schematic block diagram of steps of an encoding method 1000 for encoding a video picture PCT1 comprising at least one picture area-noted PA-defined by 3 picture components CP1, CP2 and CP3, according to a particular exemplary embodiment. This encoding method comprises steps 1002-1010 steps which may be performed for each picture area of the video picture PCT1. For a matter of conciseness, the method 1000 is described below for a given picture area PA, bearing in mind that the same method may be applied for each picture area PA of the video picture PCT1.

In a converting step 1002, at least part of a picture area PA of the video picture PCT1 is converted according to a conversion mode MD (e.g., MD0), in the same manner as in step 402 (FIG. 4), step 504 (FIG. 5A) or step 604 (FIG. 6), so as to obtain a at least partially converted picture area. This conversion allows testing the considered conversion mode MD to assess whether it is an appropriate candidate conversion mode for said picture area PA. As described further below, although a total conversion of the picture area PA may be performed, variants are also possible where only part of the picture area PA is converted in step 1002.

Further, in a selecting step 1004, it is determined whether the distance between a main direction DR1 determined from the at least partially converted partial area and a target direction DR0 complies with a threshold TH1 (e.g., is below or above the threshold depending on the metrics used). In the affirmative, the conversion mode MD (e.g., MD0) used for conversion in converting step 1002 is selected (step 1004) as a candidate conversion mode for the picture area PA. To this end, the conversion mode MD may be added to a list (or set) of candidate conversion modes. In other words, a conversion mode MD is selected as a candidate conversion mode when it causes a main direction DR1 in the at least partially converted picture area to be sufficiently aligned with the target direction DR0, for instance with an angular difference complying with (e.g., below or above) a threshold TH1.

Selecting step 1004 may comprise a pre-analysis of the at least partially converted picture area to extract therefrom a main direction DR1. This pre-analysis may be performed to Identify directional features from the at least partially converted picture area and to determine therefrom a main direction DR1, Various image processing techniques may be used to detect a main direction DR1, as described later in particular exemplary embodiments.

Steps 1002 and 1004 may be performed for each of a plurality of conversion modes (e.g., for MD0 to MD6 as previously described) to select one or more of them as candidate conversion mode(s) for the picture area PA at hand.

In selecting step 1006, a conversion mode MDS is selected for the considered picture area PA among the one or more candidate conversion modes obtained in selecting step 1004. As already described (step 502 of FIGS. 4-6), the selected conversion mode MDS is retained as the most appropriate conversion mode for converting the picture area PA prior to encoding.

In a first example, the list of candidate conversion modes obtained in selecting step 1004 for a picture area PA only contains a single candidate conversion mode. In that case, the conversion mode MDS selected in selecting step 1006 is the single candidate conversion mode.

In a second example, the list of candidate conversion modes obtained in selecting step 1004 for a picture area PA contains a plurality of candidate conversion modes MD. In that case, the candidate conversion mode with the lowest rate-distortion trade-off (or rate-distortion score) may be selected in step 1008 (FIG. 10). In other words, if a plurality of candidate conversion modes MD is pre-selected in selecting step 1004, the candidate conversion mode with the lowest rate-distortion trade-off may be selected as selected conversion mode MDS in step 1008.

In a particular example, the candidate conversion mode MD with the lowest rate-distortion trade-off (or rate-distortion score, using for instance a known technique of rate-distortion optimization (RDO)) may be selected in step 1008 as a first (fast) pass of an encoding loop. This first pass may be such that some or most coding tools (e.g., template based tools—like ITMP, TIMD . . . —and in-loop filter—like deblocking, ALF, SAO . . . ) are disabled and the partitioning is constrained (in depth splitting and partitioning modes) in order to rapidly select the best candidate conversion mode. Then, the actual encoding with the selected conversion mode may be performed in a second pass of the encoding loop. This way, flexibility and efficiency can be achieved at the encoding stage. Pre-processing of the image to be encoded allows to limit power consumption and encoding time.

In step 1008, a rate-distortion score may be computed for each picture (or part of picture or picture component CP) converted with a candidate conversion mode and the obtained rate-distortion scores are compared to identify the candidate conversion mode begetting the lowest rate-distortion score.

In an encoding step 1010, which may be identical to encoding step 404 (FIG. 4), encoding step 506 (FIG. 5A) or encoding step 160 (FIG. 6), each picture component CP converted based on the conversion mode MDS selected in selecting step 1006 for said picture area PA is encoded into a bitstream BT1 of encoded video picture data.

As indicated earlier, a total or partial conversion of the picture area PA may be performed in conversion step 1002 of FIG. 10, Exemplary variants of the encoding method of FIG. 10 are described with reference to FIGS. 11 and 12.

FIG. 11 shows a schematic block diagram of steps of an encoding method 1100 for encoding a video picture PCT1 comprising at least one picture area PA defined by 3 picture components CP1, CP2 and CP3, according to a particular exemplary embodiment. This encoding method comprises steps 1102-1006 which may be performed for each picture area PA of the video picture PCT1. For a matter of conciseness, the method 1100 is described below for a given picture area PA, bearing in mind that the same method may be applied for each picture area PA of the video picture PCT1.

In a converting step 1102, converted picture components are obtained by totally converting a picture area according to each of a set of candidate conversion mode MD0-MD6, for instance as described in step 402 (FIG. 4), step 504 (FIG. 5A) or step 604 (FIG. 6). In other words, a respective converted version of the picture area PA is obtained for each conversion mode MD0-MD6. Converting step 1102 can be considered as a particular implementation of converting step 1002 (FIG. 10) where the totality of the picture area PA is converted. As already mentioned, this conversion allows testing various conversion modes MD to assess whether each of them is an appropriate candidate conversion mode for said picture area PA.

In a determining step 1104, a main direction noted DR1 is determined for each converted picture area obtained in step 1102 using respectively conversion modes MD0-MD6. Determination of a main direction DR1 in a converted picture area can be made based on a feature-extraction analysis of the converted picture area, for instance by performing an edge detection function (e.g., including Sobel and/or Cany filters). A histogram of gradients or a Hough transform (or a derivative) may be used to that end. For instance, by successively applying an edge detection algorithm (like Sobel or Canny filters) and then a histogram of gradients or a Hough transform (or a derivative) one or more main directions DR1 may be determined in a converted picture area.

In particular, a Hough transform can be computed to determine which direction(s) is/are the most represented in each converted picture area. In a particular example, a histogram of gradients is subsampled in order to identify plural close directions from a converted picture area and to determine a main direction DR1 by averaging these close directions.

In a determining step 1106, at least one candidate conversion mode MD (among MD0-MD6) is determined or identified for the picture area PA when a distance between a main direction DR1 determined in step 1104 and a target direction DR0 complies with (e.g., is above or below) a threshold TH1. To this end, a comparison can made between each main direction DR1 determined in step 1104 and the target direction DR0 to assess the distance therebetween and determine whether said distance complies with (e.g., is above or below) the threshold TH1. The target direction DR0 represents for instance a top-left to bottom-right diagonal in the converted picture component.

In a particular exemplary embodiment, the distance between a main direction DR1 and the target direction DR0 is assessed by computing a scalar product of vectors representing the main direction DR1 and the target direction DR0, respectively. The higher the scalar product, the closer the main direction DR1 is from the target direction DR0 (the higher is the distance DR1-DR0), and thus the better is the corresponding conversion mode as a potential candidate conversion mode. A conversion mode MD is for instance selected as a candidate conversion mode if the scalar product between vectors of the main direction DR1 (obtained from a picture component converted with said conversion mode) and the target direction DR0 is above a threshold TH1.

The method 1100 may then continue with steps 1006-1010 as previously described with reference to FIG. 10. In particular, a conversion mode MDS may be selected (step 1006) based on the one or more candidate conversion mode(s) MD identified in identifying step 1106 and encoding (step 1010) may then be performed to encode, into a bitstream BT1, the component CP converted according to the selected conversion mode MDS.

As can be seen, in the particular exemplary embodiment of FIG. 11, a picture area PA is totally converted according to each conversion mode MD0-MD6 and then a main direction DR1 is determined from each totally converted picture area. The best candidate conversion mode(s) can then be determined based on the totally converted pictures.

As an alternative, the main direction DR1 is only extracted from the original picture PCT1 (or each picture area PA), Knowing DR1, one can determine the conversion mode MDS among MD0-MD6 that maximize the scalar product with the target direction DR0. Indeed, only the direction DR1 is converted with each conversion mode MD0-MD6 and the result of each conversion provides a direction which is compared with DR0, without the need of converting the total picture PCT1 according to each mode MD0-MD6 and applying a DR1 extraction process for each of the converted picture. Possibly, the main direction DR1 extraction process is operated on the first component CP1 or a subsampled version of the first component CP1 to save resources (and computing time) at the encoder.

FIG. 12 shows a schematic block diagram of steps of an encoding method 1200 for encoding a video picture PCT1 comprising at least one picture area PA defined by 3 picture components CP1, CP2 and CP3, according to a particular exemplary embodiment. This encoding method comprises steps 1202-1206 steps which may be performed for each picture area PA of the video picture PCT1. For a matter of conciseness, the method 1200 is described below for a given picture area PA, bearing in mind that the same method may be applied for each picture area PA of the video picture PCT1.

In a determining step 1202, a main direction noted DR1$a$ is determined in a given picture area PA of the video picture PCT1. This determination may be performed based on a feature-extraction analysis of the picture area PA, in an analogous manner to the determining step 1104 (FIG. 11). For instance, this feature-extraction analysis may involve executing an edge detection function (e.g., including Sobel and/or Cany filters). A histogram of gradients or a Hough transform (or a derivative) may be used to that end. In particular, a Hough transform can be computed to determine which direction(s) is/are the most represented in the picture area PA. In a particular example, a histogram of gradients is subsampled in order to identify plural close directions from the picture area PA and to determine a main direction DR1$a$ by averaging these close directions.

In a converting step 1204, the main direction DR1$a$ obtained in step 1202 is converted into a main direction noted DR1 according to each conversion mode MD0-MD6. As a result, a respective main direction DR1 (in converted form), corresponding to the main direction DR1$a$ in the original picture area PA, is obtained for each conversion mode MD0-MD6. For instance, a principal direction vector corresponding to the main direction DR1$a$ in the picture area PA (in the original picture PCT1) is Identified in step 1202 and then converted to determine a corresponding main direction DR1 according to each conversion mode MD0-MD6.

Determining step 1202 and converting step 1204 may be considered as a particular implementation of converting step 1002 (FIG. 10).

In a determining step 1206, at least one candidate conversion mode MD (among MD0-MD6) is determined or identified for the picture area PA when a distance between a main direction DR1 determined in step 1204 and a target direction DR0 complies with (e.g. is above or below) a threshold TH1. To this end, the determining step 1206 may be performed in an analogous manner to determining step 1106 (FIG. 11). In particular, a comparison can be made between each main direction DR1 determined in step 1204 and the target direction DR0 to assess the distance therebetween and determine whether said distance complies with (e.g., is below or above) the threshold TH1. As already indicated, the target direction DR0 represents for instance a top-left to bottom-right diagonal in the converted picture area.

The method 1200 may then continue with steps 1006-1010 as previously described with reference to FIG. 10. In particular, a conversion mode MDS may be selected (step 1006) based on the one or more candidate conversion mode(s) MD identified in identifying step 1206 and encoding (step 1010) may then be performed to encode, into a bitstream BT1, the picture area PA converted according to the selected conversion mode MDS.

As can be seen, in the particular exemplary embodiment of FIG. 12, one or more candidate conversion modes MD are obtained in encoding method 1200 based on a partially converted picture area which is obtained by only partially converting the picture area according to each conversion mode MD0-MD6. Only one or more identified main direction in the picture area PA (in the original content) may be converted to determine the closest direction to the desired target direction DR0 (e.g., top-left to bottom-right diagonal). There is thus no need in this particular exemplary embodiment to totally convert the picture area PA according to each possible conversion mode MD0-MD6, thereby saving time and resources for selecting the most appropriate conversion mode MDS for each picture area PA.

Further, as already described (FIG. 1), partitioning of a video picture PCT1 may be performed (as a pre-processing prior to the encoding loop) into CTUs of a CTU grid. More particularly, each picture area PA of the video picture PCT1 may be partitioned into CTUs of a CTU grid, wherein each CTU is partitioned in one or more coding units (CUs). It has been observed, however, that since content resolution of a video picture PCT1 is generally not multiple of the CTU size (e.g., 128), the CTU grid relative to the original video content PCT1 may be spatially aligned in different ways (relatively to the video picture PCT1 to be compressed). It has been found that this particular relative arrangement of the picture content (picture area(s)) with respect to the CTU grid can be leveraged to improve even further compression efficiency at the encoding stage.

For picture content exhibiting horizontal and/or vertical main direction(s), a conversion mode MDS used for converting a picture area PA of the video picture PCT1 can be selected based on the position of boundaries (or edges) of the CTU grid (or CU grid) relative to said horizontal and/or vertical main direction(s). In particular, it is advantageous to select the conversion mode which better aligns the CTU (or CU) grid with said horizontal and/or vertical main direction(s) of the video picture PCT1 (or of the picture area PA). This case particularly applies to screen content type of content which exhibits strong horizontal and vertical directions.

The relative position of the CTU (or CU) grid (and in particular of boundaries thereof) can be known for different conversion modes MD, e.g., for each conversion mode MD0-MD6, since this position only depends on the CTU size and the resolution of the video picture PCT1. It is noted that the CTU (or CU) grid does not move per se, it starts in the top-left part of the picture at coordinate (0, 0). However, the conversion mode operated on the video picture PCT1 acts as if the CTU (or CU) grid was moved (see FIG. 13B) once the converted picture is de-converted.

Figure 13A:
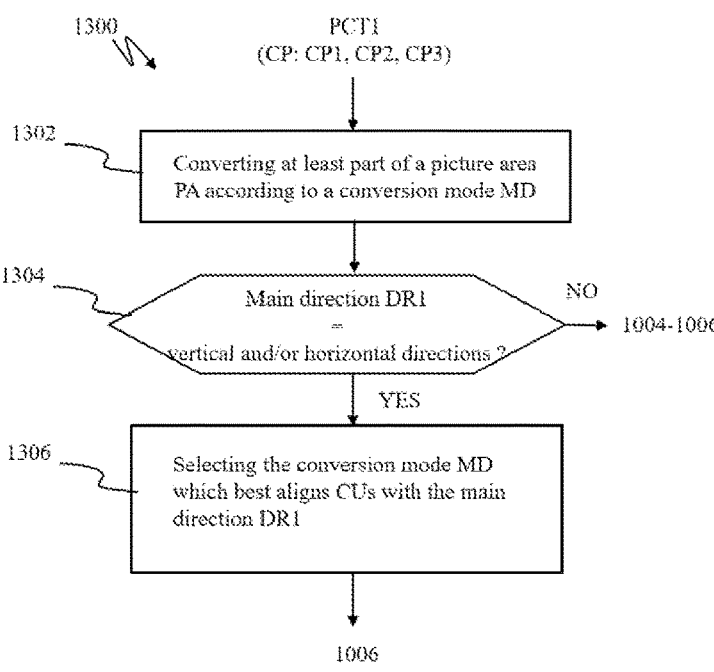
FIGS. 13A and 13B show an encoding method according to particular exemplary embodiments of the present application.

In a particular exemplary embodiment, the conversion mode MDS may thus be selected (e.g., in step 1006 of FIG. 10), from a list of candidate conversion mode(s) by aligning boundaries of coding units (CUs) (or CTUs, or blocks) with the main directions of a picture area PA of the video picture, each CTU being a picture area subdivided according to a coding tree, Particular implementations are described hereafter, FIG. 13A shows a schematic block diagram of steps of an encoding method 1300 for encoding a video picture PCT1 comprising at least one picture area PA defined by 3 picture components CP1, CP2 and CP3, according to a particular exemplary embodiment. This encoding method comprises steps 1302-1306 steps which may be performed for each picture area PA of the video picture PCT1. For a matter of conciseness, the method 1300 is described below for a given picture area PA, bearing in mind that the same method may be applied for each picture area PA of the video picture PCT1.

In a converting step 1302, at least part of a picture area PA is converted according to a conversion mode MD (e.g., MD1), in the same manner as in converting step 1002 (FIG. 10). As already described, the picture area PA may be totally or only partially converted to determine from the totally or partially converted picture area a respective main direction DR1 (one or multiple main directions DR1) with each conversion mode MD0-MD6. For instance, the picture area PA is totally converted according to each conversion mode MD0-MD6 and a main direction DR1 is then determined from each converted picture area (steps 1102-1104, FIG. 11), or a main direction DR1$a$ is determined in the picture area PA prior to conversion and the main direction DR1$a$ is then converted into a respective main direction DR1 according to each conversion mode MD0-MD6 (steps 1202-1204, FIG. 12).

It is noted that one or more main directions DR1 may be determined as indicated above. In the following examples, it is assumed that one main direction DR1 is determined although a plurality of main directions DR1 may be determined and processed in an analogous manner.

In a determining step 1304, it is determined a main direction DR1 from the at least partially converted picture area obtained in converting step 1302, in the same manner as already described for selecting step 1004 (FIG. 10), for instance based on a pre-analysis of the at least partially converted picture area to extract therefrom the main direction DR1. Further, still in determining step 1304, it is determined whether the main direction DR1 is vertical and/or horizontal. In other words, it is determined whether the main direction DR1 is parallel (or substantially parallel) to the boundaries of coding units (CUs).

A vertical or horizontal direction (or edge) may correspond to a separation between two sets of pixels, the pixels of each set sharing particular picture properties.

In a particular exemplary embodiment, it is determined in determining step 1304 that the main direction DR1 is aligned with the horizontal and/or vertical directions if an angular deviation of the main direction DR1 relative to the vertical and/or horizontal directions is below a deviation threshold. For instance, a main direction DR1 is substantially (approximatively) vertical or substantially horizontal if it exhibits a deviation angle of no more than +/-15 degrees relative to a vertical or horizontal line (or another target direction). In other words, a main direction DR1 qualifies as horizontal or vertical subject to a certain angular tolerance with respect to the horizontal or vertical directions.

If it is determined (step 1304) that the main direction DR1 is not vertical and/or horizontal, the method 1300 continues as already described earlier to select the most appropriate conversion mode MD, for instance by performing steps 1004-1006 (FIG. 10). For instance, a method based on a scalar product as already described is used.

However, if it is determined (step 1304) that the main direction DR1 is horizontal and/or vertical (or substantially horizontal and/or vertical), the method 1300 proceeds to a selecting step 1306 as described further below.

In the selecting step 1306, the conversion mode MD (I.e., the one used in converting step 1302 to convert the at least part of a picture area PA) is selected as a candidate conversion mode MD if the alignment difference (or position offset) between the main direction DR1 and boundaries of CUs (or CTUs) of the at least part of a picture area PA meets with a threshold (e.g., is above or below the threshold, depending on the metrics used). In other words, as the main direction DR1 is vertical and/or horizontal, the conversion mode MD is selected (1306) by aligning said main direction DR1 with boundaries of coding units, CUs. For instance, the conversion mode MD which is the selected is the one causing the main direction DR1 to overlap with a maximum number of CU boundaries (or to overlap the most with CU boundaries).

In a particular exemplary embodiment, the conversion mode (e.g., among MD0-MD6) which best aligns CUs (or CTUs) of the at least part of a picture area PA with the main direction DR1 is selected in step 1306 as the selected conversion mode MDS. In particular, horizontal or vertical boundaries of the CTU grid may be spatially shifted to be positioned in registration with (or substantially in registration with) the main direction DR1 according to the selected conversion mode MDS.

The conversion mode MD for a given picture area PA may for instance be selected based on a minimization of distance between CU boundaries (or CU edges) and main direction(s) DR1 of the picture content. In a particular example, a conversion mode MD for a given picture area PA may be selected based on the result of a technique, where data to be optimized are the x-positions of CTU columns (flipped/de-flipped or rotated/de-rotated) of conversion modes MD for a given width against the content vertical edges and the y-positions of CTU rows (flipped/de-flipped or rotated/de-rotated) of conversion modes MD for a given height against the content horizontal edges. Preferably, the CU boundaries or block (contained in CTU) boundaries are aligned with main direction(s) of the video picture PCT1.

Figure 13B:
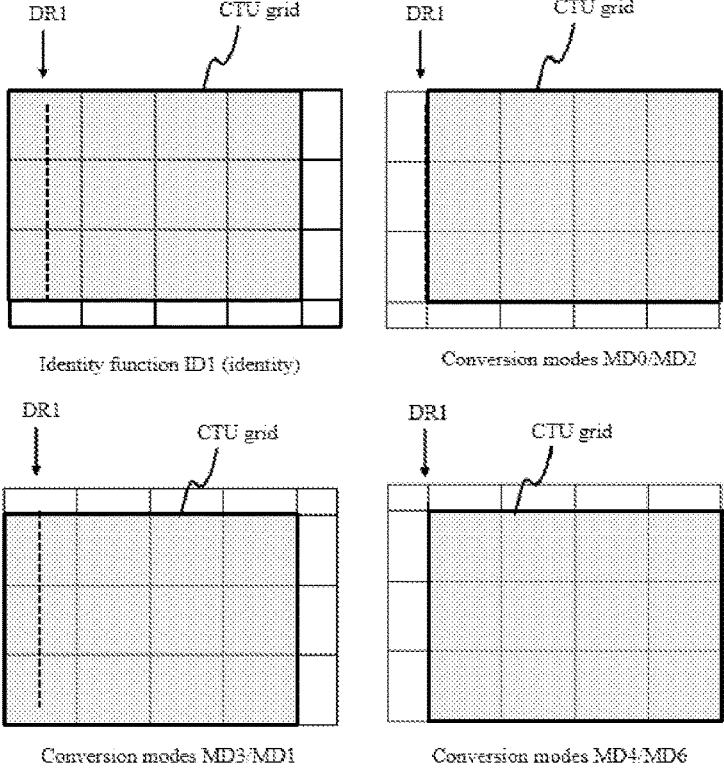

FIG. 13B illustrates by way of examples different alignments of the CU grid relative to a picture area PA which has been converted and de-converted according to different conversion modes MD0-MD6. Depending on the applied conversion mode, the CU grid aligns more or less with a main direction DR1 of the converted picture area (where the main direction DR1 is vertical in this particular example).

Further, in any one of the encoding methods previously described with reference to FIGS. 3-13, the encoding method may comprise a step of signaling (or inserting), into the bitstream BT1 of encoded video picture data, area conversion information DT1 as described with reference to the encoding method 500 of FIG. 5A, to indicate if at least one picture area PA of the video picture PCT1 is converted according to a conversion mode MD, and possibly also to define at least one conversion mode MDS (possibly each conversion mode MDS) selected for converting at least one picture area PA of the video picture.

Further, as already indicated, the present application also concerns decoding a video picture, e.g., a video picture previously encoded according to any one of the encoding methods previously described. Decoding methods according to particular exemplary embodiments are described hereafter. As will be apparent, the concept of encoding described earlier in various exemplary embodiments may be applied in a reverse manner to decode an encoded video picture.

Figure 14:
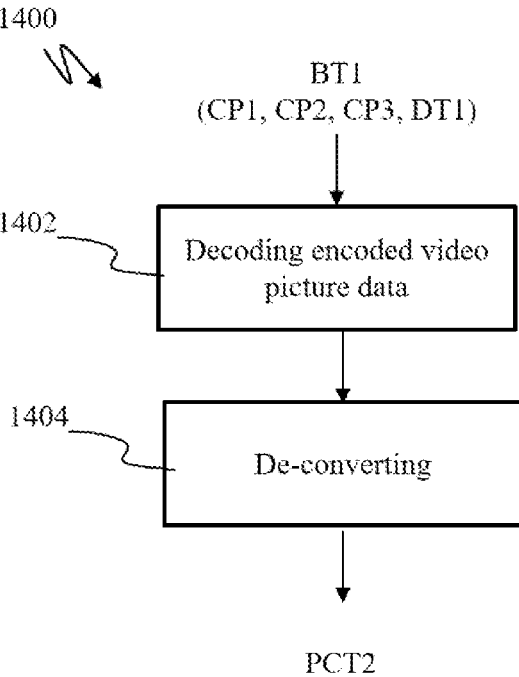
FIG. 14 shows a decoding method according to particular exemplary embodiments of the present application.

FIG. 14 shows a schematic block diagram of steps of a decoding method 1400 for decoding a bitstream BT1 of encoded video picture data according to a particular exemplary embodiment. In the following exemplary embodiments, it is assumed that the bitstream BT1 has been generated according to any one of the previously described encoding methods.

A bitstream BT1 of encoded video picture data is obtained as input of the decoding method 1400. By way of an example, the encoded video picture data may comprise, in encoded form, a video picture PCT1 comprising at least one picture area defined by 3 picture components CP1, CP2 and CP3.

In a decoding step 1402, a decoded video picture is obtained by decoding the encoded video picture data from the bitstream BT1.

In a de-converting step 1404, a video picture is obtained by de-converting (or unconverting), according to a conversion mode MD, at least one picture area of the decoded video picture obtained in decoding step 1402. This conversion mode MD defines a combination of at least one flipping operation and at least one rotation operation to said at least one picture area. The description provided earlier with respect to a conversion mode at the encoding stage applies in the same manner to a conversion mode at the decoding stage. In particular, the conversion mode MD used at the decoding stage may for Instance be any one of MD0-MD6 as previously described.

As already indicated, de-converting a picture area PA according to a given conversion mode means that an inverse conversion (flipping and rotation) is applied, i.e., a conversion that is inverse to said given conversion mode (e.g., inverse to the conversion mode previously applied at an encoding stage to encode the video picture into the bitstream BT1). Applying an inverse conversion, i.e., de-converting, allows to convert back the picture area PA to its original orientation or state prior to the conversion performed at the encoding stage.

Decision on the conversion mode used in de-converting step 1404 is made at the picture area level. Accordingly, each picture area PA of the decoded video picture (or a part thereof) may be de-converted based on a respective conversion mode MD so as to obtain a video picture. In a particular example, at least two picture areas (or a part thereof) may be de-converted based on a different conversion mode MD so as to obtain a video picture, although two picture areas may also be de-converted based on a same conversion mode MD in some instances. In a particular example, the video picture PCT1 previously encoded by executing an encoding method as previously described can thus be obtained in de-converting step 1504.

In a particular exemplary embodiment, area conversion information DT1 may be signaled (or comprised) in the bitstream BT1 obtained as input of the decoding method 1400, as previously described for the encoding methods in particular exemplary embodiments. This area conversion information DT1 may indicate if at least one picture area PA of the video picture PCT1 Is converted (i.e., has been converted) according to a conversion mode MD.

As already described, the format and way this information is carried into the bitstream BT1 may be adapted on a case-by-case basis. For instance, the area conversion information DT1 may comprise a bit or an indicator which is either at a first value to indicate that no picture area conversion has been made or at a second different value to indicate that at least one picture area conversion has been made. In a particular example, the area conversion information DT1 is carried in the bitstream BT1, as a header, or a parameter, or an SEI (supplemental enhancement information) message with said bitstream.

As described further below, de-converting of the video picture data at the decoding stage may be performed based on the area conversion information DT1. In particular, the bitstream BT1 may be formatted to include encoded video picture data and area conversion information DT1. Particular exemplary embodiments of the decoding method 1400 (FIG. 14) are described hereafter.

In a particular exemplary embodiment, area conversion information DT1 is detected within the bitstream BT1 of encoded video picture data. In particular example, the bitstream BT1 is decoded in decoding step 1402 and the area conversion information DT1 is detected from the decoded bitstream DT1. The area conversion information DT1 may be carried within the bitstream BT1 In any appropriate manner, for instance as described in particular exemplary embodiments of the encoding method of the application. Based on the detected area conversion information DT1, it is determined that at least one picture area of the decoded video picture must be de-converted, thereby triggering the de-converting step 1404 as previously described.

In a particular exemplary embodiment, the area conversion information DT1 further defines at least one conversion mode MD selected (also noted MDS) and applied at the encoding stage for converting at least one picture area PA of the video picture PCT1. For Instance, the area conversion information DT1 may specify the conversion mode MD5 (or MD6) applied for converting a picture area PA of the video picture PCT1 (see FIG. 4). As previously described, the conversion mode MD5 (or MD6) defines a combination of a rotation operation and a flipping operation. This conversion mode may be selected at the encoding stage among conversion modes MD0-MD6.

In a particular exemplary embodiment, it is determined, based on the detected area conversion information DT1, the conversion mode MD according to which the at least one picture area PA is de-converted in de-converting step 1404. For instance, the respective conversion mode MD to be used for de-converting each picture area PA may be determined based on the area conversion Information DT1 parsed from the bitstream BT1.

In other variants, the area conversion information DT1 is not signaled within the bitstream BT1 but this information Is obtained as part of the decoding method 1400 by any other appropriate means (for instance by receiving as input of the decoding method 1400 the applied conversion mode(s) MD from the received bitstream BT1).

Figure 15:
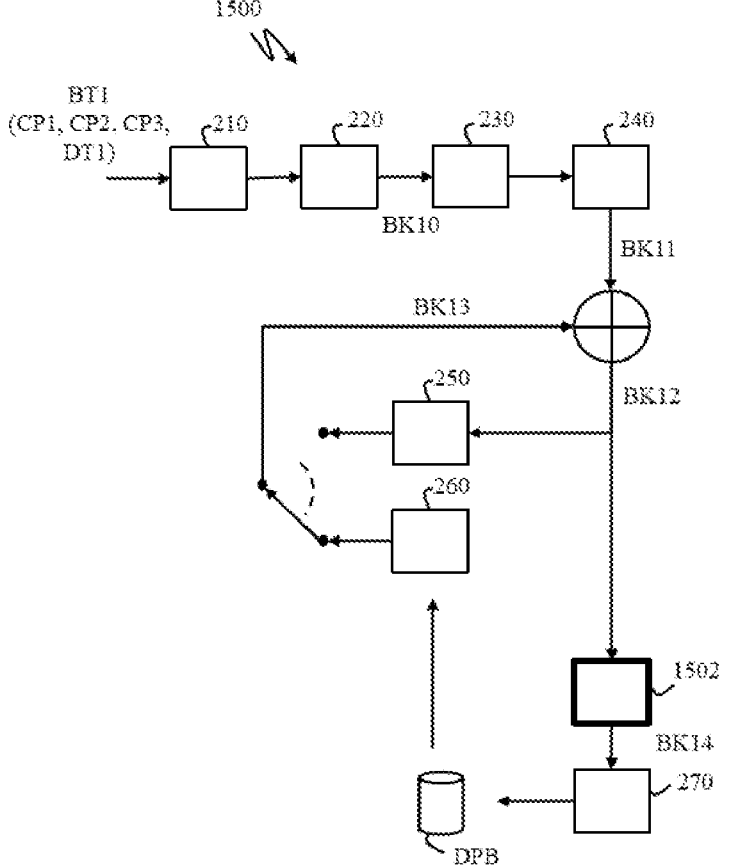
FIG. 15 shows a decoding method according to particular exemplary embodiments of the present application.

FIG. 15 shows a schematic block diagram of steps of a decoding method 1500 for decoding a video picture PCT1 (or a part thereof) from a bitstream BT1 of encoded video picture data, according to a particular exemplary embodiment. In the present example, it is assumed that the video picture PCT1, defined in a coded form within the bitstream BT1, comprises at least one picture area defined by 3 picture components CP1, CP2 and CP3, as already described for encoding methods of the present application. It is assumed hereafter that the at least one picture area which is decoded comprises the entirety of the video picture PCT1, although variants are possible where only a part of the video picture PCT1 is decoded.

The particular exemplary embodiment of FIG. 15 may correspond to an exemplary implementation of the decoding method 1400 (FIG. 14). As can be seen, the decoding method 1500 of FIG. 15 comprises steps already described with reference to FIG. 2 and will thus not be described again in details for a matter of conciseness.

In step 210, partitioning information data, prediction information data and quantized transform coefficient block (or quantized residual block) are obtained by entropy decoding the bitstream BT1 of encoded video picture data (parsing of the data contained in the bitstream BT1). For Instance, the received bitstream BT1 has been generated in accordance with an encoding method as previously described in any particular exemplary embodiment of the present application.

Other information data may also be entropy decoded from the bitstream BT1 for decoding a current block of the video picture VP, such as component conversion information DT1 as previously described.

In step 220, a decoded picture is divided into current blocks BK10 based on the partitioning information. In other words, a partitioning of the decoding picture into current blocks BK10 is obtained based on the partitioning information. Each current block BK10, entropy decoded from the bitstream BT1 (step 210), defines (or comprises samples of) one component CP of the encoded video picture PCT1. All blocks BK10 thus define each component CP of the encoded video picture PCT1.

Each decoded current block BK10 is either a quantized transform coefficient block or quantized prediction residual block. The decoding process is described here below for a given current block BK10 corresponding to a respective component CP of the video picture PCT1, bearing in mind that the same process can be iterated for each successive current block BK10 to reconstruct the video picture PCT1.

In step 230, the current block BK10 is de-quantized and possibly inverse transformed (step 240), to obtain a decoded prediction residual block BK11.

On the other hand, the prediction information data extracted from the bitstream BT1 is used to predict the current block. A predicted block BK13 is obtained through its intra prediction (step 250) or its motion-compensated temporal prediction (step 260). The prediction process performed at the decoding side is identical to that of the encoding side (as described earlier).

Next, the decoded prediction residual block BK11 and the predicted block BK13 are combined, typically summed, which provides a reconstructed block BK12.

In a de-converting step 1502, the component CP defined by the reconstructed block BK12 is de-converted based on a conversion mode MD, said conversion mode MD defining a combination of at least one flipping operation and at least one rotation operation to said picture component CP as already described. The conversion mode MD applied for de-converting the reconstructed block BK12 in step 1502 may be determined based on area conversion information DT1 obtained by any appropriate means as previously described, for instance based on area conversion information DT1 extracted from the bitstream BT1 received as input of the decoding method 1500.

The video picture PCT1 can thus be obtained by de-converting, according to the same conversion mode MD, each picture component CP defining the decoded video picture PCT1. To this end, each current block BK12 is successively de-converted (step 1502) by applying thereto the same conversion mode MD, i.e. the conversion mode previously used at the encoding stage for encoding the video picture PCT1.

The decoding method 1500 may then carry on in the same manner as decoding method 200 (FIG. 2). In particular, in step 270, in-loop filters may apply to a reconstructed picture (comprising reconstructed blocks BK14 which has been de-converted) and the reconstructed blocks or the filtered reconstructed blocks form a reference picture that may be stored into a decoded picture buffer (DPB) as above discussed (FIGS. 1-2).

Further, in some instances, cross-component filtering (or cross-component tools) may be applied at the encoding stage and/or at the decoding stage to determine at least one component CP of a video picture based on another component CP of said video picture. As described for instance with respect to FIG. 1 (cross-component filtering step 190), in-loop filters may be applied to reconstructed picture (comprising reconstructed blocks) to reduce compression artefacts. The cross-component filters can be applied after all picture blocks are reconstructed. In-loop filters may be applied in the same manner to a reconstructed picture during decoding as previously described with respect to FIG. 2 (cross-component filtering step 270). Cross-component filtering is a well-known technique, which may include for instance Cross-Component Linear Model (CCLM), CCC-ALF in VVC, CC-SAO In exploratory ECM, etc.

In an exemplary embodiment, the sequence parameter set may be modified as follows to indicate the activation of conversion mode:

|  | Descriptor |
|---|---|
| seq_parameter_set_rbsp( ) { | |
| ... | |
| sps_sao_enabled_flag | u(1) |
| sps_alf_enabled_flag | u(1) |
| if( sps_alf_enabled_flag  &&  sps_chroma_format_idc != 0 ) | |
| sps_ccalf_enabled_flag | u(1) |
| sps_lmcs_enabled_flag | u(1) |
| sps_afr_enabled_flag | u(1) |
| ... | | where sps_afr_enabled_flag indicates whether adaptive flipping or rotation is enabled as the sequence level.

In an exemplary embodiment, the component conversion information DT1 used for each component CP as described earlier is defined in a picture header, picture parameter set, adaptation parameter set or other parameter set, as shown below:

|  | Descriptor |
|---|---|
| adaptation_parameter_set_rbsp( ) { | |
| aps_params_type | u(3) |
| aps_adaptation_parameter_set_id | u(5) |
| aps_chroma_present_flag | u(1) |
| if( aps_params_type  = =  ALF_APS ) | |
| alf_data( ) | |
| else if( aps_params_type  = =  LMCS_APS ) | |
| lmcs_data( ) | |
| else if( aps_params_type  = =  SCALING_APS ) | |

-continued

| | Descriptor |
|---|---|
| scaling_list_data( ) | |
| else if( aps_params_type = = AFR_APS ) | |
| afr_data( ) | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | | where afr_data( ) is defined as follows:

| | Descriptor |
|---|---|
| afr_data( ) { | |
| afr_mode_idc | u(3) |
| } | |

Where afr_mode_idc points to the following mode:
0=identity
1=horizontal flip,
2=90° rotation
3=270°/−90° rotation
4=vertical flip,
5=horizontal and vertical flip,
6=vertical flip with 90° rotation
7=vertical flip with 270°/90° rotation.

As a variant, if no conversion mode is signalled, it means identity mode, i.e., identify function (identity=default).

As a variant, signalling bits for indicating flipping and rotation are separate (i.e. some bits signal flipping horizontal and/or vertical and other bit(s) signal rotations, and possibly other bits signal direction of rotation).

Information in picture header may allow determining which afr_data( ) is used for the current picture.

Further, the present application concerns an encoding system (or encoding device) and a decoding system (or decoding device) configured respectively to perform any one of the encoding and decoding methods described earlier according to particular exemplary embodiments. The encoding system and the decoding system may comprise suitable means (or modules) configured perform each step of the encoding and decoding methods, according to any one of the above-described exemplary embodiments, Particular exemplary embodiments of such systems are described hereafter.

Figure 16:
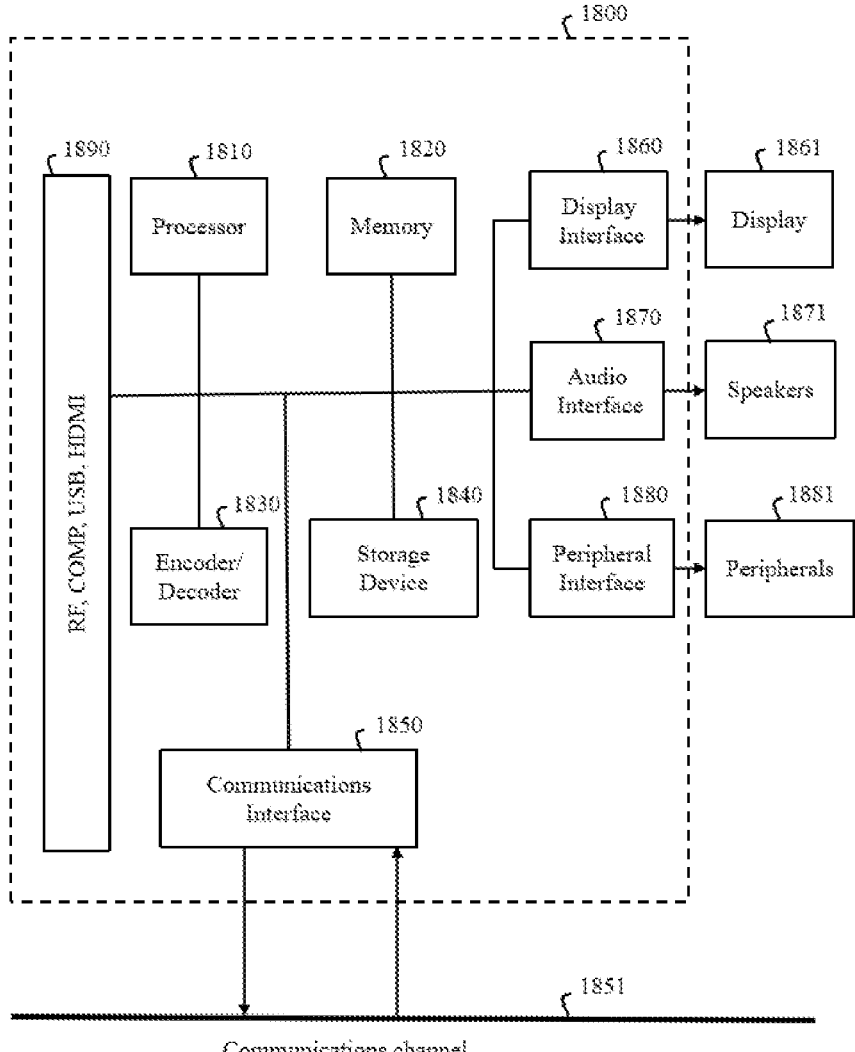
FIG. 16 illustrates a schematic block diagram of an example of a system in which various aspects and exemplary embodiments are implemented.

FIG. 16 shows a schematic block diagram illustrating an example of a system 1800 in which various aspects and exemplary embodiments are implemented.

System 1800 may be embedded as one or more devices including the various components described below. In various exemplary embodiments, system 1800 may be configured to implement one or more of the aspects described in the present application. For instance, the system 1800 is configured to perform an encoding method and/or a decoding, according to any one of the previously described exemplary embodiments. The system 1800 may thus constitute an encoding system and/or a decoding system in the sense of the present application.

Examples of equipment that may form all or part of the system 1800 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, video servers (e.g. a broadcast server, a video-on-demand server or a web server), still or video camera, encoding or decoding chip or any other communication devices. Elements of system 1800, singly or in combination, may be embodied in a single integrated circuit (IC), multiple ICs, and/or discrete components. For example, in at least one exemplary embodiment, the processing and encoder/decoder elements of system 1800 may be distributed across multiple ICs and/or discrete components. In various exemplary embodiments, system 1800 may be communicatively coupled to other similar systems, or to other electronic devices, via, for example, a communications bus or through dedicated input and/or output ports.

System 1800 may include at least one processor 1810 configured to execute instructions loaded therein for implementing, for example, the various aspects described in the present application, Processor 1810 may include embedded memory, input output interface, and various other circuitries as known in the art. System 1800 may include at least one memory 1820 (for example a volatile memory device and/or a non-volatile memory device). System 1800 may include a storage device 1840, which may Include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 1840 may include an internal storage device, an attached storage device, and/or a network accessible storage device, as non-limiting examples.

System 1800 may include an encoder/decoder module 1830 configured, for example, to process data to provide encoded/decoded video picture data, and the encoder/decoder module 1830 may include its own processor and memory. The encoder/decoder module 1830 may represent module(s) that may be included in a device to perform the encoding and/or decoding functions. As is known, a device may Include one or both encoding and decoding modules. Additionally, encoder/decoder module 1830 may be Implemented as a separate element of system 1800 or may be incorporated within processor 1810 as a combination of hardware and software as known to those skilled in the art.

Program code to be loaded onto processor 1810 or encoder/decoder 1830 to perform the various aspects described in the present application may be stored in storage device 1840 and subsequently loaded onto memory 1820 for execution by processor 1810. In accordance with various exemplary embodiments, one or more of processor 1810, memory 1820, storage device 1840, and encoder/decoder module 1830 may store one or more of various items during the performance of the processes described in the present application. Such stored items may include, but are not limited to video picture data, information data used for encoding/decoding video picture data, a bitstream, matrices, variables, and intermediate or final results from the processing of equations, formulas, operations, and operational logic.

In several exemplary embodiments, memory inside of the processor 1810 and/or the encoder/decoder module 1830 may be used to store instructions and to provide working memory for processing that may be performed during encoding or decoding.

In other exemplary embodiments, however, a memory external to the processing device (for example, the processing device may be either the processor 1810 or the encoder/decoder module 1830) may be used for one or more of these functions. The external memory may be the memory 1820 and/or the storage device 1840, for example, a dynamic volatile memory and/or a non-volatile flash memory. In several exemplary embodiments, an external non-volatile flash memory may be used to store the operating system of a television. In at least one exemplary embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), AVC, HEVC, EVC, VVC, AV1, etc.

The input to the elements of system 1800 may be provided through various input devices as indicated in block 1890. Such Input devices include, but are not limited to, (i) an RF portion that may receive an RF signal transmitted, for example, over the air by a broadcaster, (ii) a Composite input terminal, (III) a USB input terminal, (Iv) an HDMI input terminal, (v) a bus such as CAN (Controller Area Network), CAN FD (Controller Area Network Flexible Data-Rate), FlexRay (ISO 17458) or Ethernet (ISO/IEC 802-3) bus when the present invention is implemented in the automotive domain.

In various exemplary embodiments, the input devices of block 1890 may have associated respective input processing elements as known in the art. For example, the RF portion may be associated with elements necessary for (I) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain exemplary embodiments, (iv) demodulating the down-converted and band-limited signal, (v) performing error correction, and (vi) demultiplexing to select the desired stream of data packets. The RF portion of various exemplary embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various exemplary embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various exemplary embodiments, the RF portion may include an antenna.

Additionally, the USB and/or HDMI terminals may include respective Interface processors for connecting system 1800 to other electronic devices across USB and/or HDMI connections. It is to be understood that various aspects of input processing, for example, Reed-Solomon error correction, may be implemented, for example, within a separate input processing IC or within processor 1810 as necessary. Similarly, aspects of USB or HDMI interface processing may be implemented within separate interface ICs or within processor 1810 as necessary. The demodulated, error corrected, and demultiplexed stream may be provided to various processing elements, including, for example, processor 1810, and encoder/decoder 1830 operating in combination with the memory and storage elements to process the data stream as necessary for presentation on an output device.

Various elements of system 1800 may be provided within an integrated housing. Within the integrated housing, the various elements may be interconnected and transmit data therebetween using suitable connection arrangement 1890, for example, an internal bus as known in the art, including the I2C bus, wiring, and printed circuit boards.

The system 1800 may include communication interface 1850 that enables communication with other devices via communication channel 1851. The communication interface 1850 may include, but is not limited to, a transceiver configured to transmit and to receive data over communication channel 1851. The communication interface 1850 may include, but is not limited to, a modem or network card and the communication channel 1851 may be implemented, for example, within a wired and/or a wireless medium.

Data may be streamed to system 1800, in various exemplary embodiments, using a Wi-Fi network such as IEEE 802.11. The Wi-Fi signal of these exemplary embodiments may be received over the communications channel 1851 and the communications interface 1850 which are adapted for Wi-Fi communications. The communications channel 1851 of these exemplary embodiments may be typically connected to an access point or router that provides access to outside networks including the Internet for allowing streaming applications and other over-the-top communications.

Other exemplary embodiments may provide streamed data to the system 1800 using a set-top box that delivers the data over the HDMI connection of the input block 1890.

Still other exemplary embodiments may provide streamed data to the system 600 using the RF connection of the input block 1890.

The streamed data may be used as a way for signaling information, such as area conversion information DT1 (as described earlier), used by the system 1800. The signaling information may comprise the bitstream BT1 and/or information such a number of pixels of a video picture and/or any coding/decoding setup parameters.

It is to be appreciated that signaling may be accomplished in a variety of ways. For example, one or more syntax elements, flags, and so forth may be used to signal information to a corresponding decoder in various exemplary embodiments.

System 1800 may provide an output signal to various output devices, including a display 1861, speakers 1871, and other peripheral devices 1881. The other peripheral devices 1881 may include, in various examples of exemplary embodiments, one or more of a stand-alone DVR, a disk player, a stereo system, a lighting system, and other devices that provide a function based on the output of system 1800.

In various exemplary embodiments, control signals may be communicated between the system 1800 and the display 1861, speakers 1871, or other peripheral devices 1881 using signaling such as AV.Link (Audio/Video Link), CEC (Consumer Electronics Control), or other communications protocols that enable device-to-device control with or without user intervention.

The output devices may be communicatively coupled to system 1800 via dedicated connections through respective interfaces 1860, 1870, and 1880.

Alternatively, the output devices may be connected to system 1800 using the communications channel 1851 via the communications interface 1850. The display 1861 and speakers 1871 may be integrated in a single unit with the other components of system 1800 in an electronic device such as, for example, a television.

In various exemplary embodiments, the display interface 1860 may include a display driver, such as, for example, a timing controller (T Con) chip.

The display 1861 and speaker 1871 may alternatively be separate from one or more of the other components, for example, if the RF portion of input 1890 is part of a separate set-top box. In various exemplary embodiments in which the display 1861 and speakers 1871 may be external components, the output signal may be provided via dedicated output connections, including, for example, HDMI ports, USB ports, or COMP outputs.

In FIGS. 1-16, various methods are described herein, and each of the methods includes one or more steps or actions for achieving the described method. Unless a specific order of steps or actions is required for proper operation of the methods, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium, such as storage device 1840 (FIG. 16) for instance. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present exemplary embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two, A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing video pictures or other communication devices. As should be clear, the equipment may be mobile and even installed in a mobile vehicle.

Computer software may be implemented by the processor 1810 or by hardware, or by a combination of hardware and software. As a non-limiting example, the exemplary embodiments may be also implemented by one or more integrated circuits. The memory 1820 may be of any type appropriate to the technical environment and may be implemented using any appropriate data storage technology, such as optical memory devices, magnetic memory devices, semiconductor-based memory devices, fixed memory, and removable memory, as non-limiting examples. The processor 1810 may be of any type appropriate to the technical environment, and may encompass one or more of microprocessors, general purpose computers, special purpose computers, and processors based on a multi-core architecture, as non-limiting examples.

As will be apparent to one of ordinary skill in the art based on the present application, implementations may produce a variety of signals formatted to carry information that may be, for example, stored or transmitted. The information may include, for example, instructions for performing a method, or data produced by one of the described implementations. For example, a signal may be formatted to carry the bitstream of a described exemplary embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The present application thus allows reorganizing, at the encoding stage, the order of the samples of each picture within the bitstream of encoded video picture data. The original order of the samples in a picture area can be modified or adapted, thereby allowing more flexibility and efficiency to be achieved during encoding. More especially, by applying a combination of at least one flipping operation and at least one rotation operation with decision at the picture area level, greater flexibility and adaptability in the process of encoding and decoding a video picture can be achieved. As explained earlier, competition between various conversion modes can provide compression coding gains by considering a wider representation of content diversity so that content principal directions may be aligned with codec preferred one. As described further below, by applying both flipping and rotation, it is possible to bring new conversion modes which could not exist otherwise. These new, hybrid, conversion modes may be particularly adapted in some cases, notably for the purpose of efficiently encoding/decoding specific video content such as gaming content or vertical videos which are becoming mainstream.

The terminology used herein is for the purpose of describing particular exemplary embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" or "associated with" to another element, it may be directly responsive or connected to or associated with the other element, or intervening elements may be present. In contrast, when an element is referred to as being "directly responsive" or "directly connected" to or "directly associated with" other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of the present application. No ordering is implied between a first element and a second element.

Reference to "one exemplary embodiment" or "an exemplary embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one exemplary embodiment" or "in an exemplary embodiment" or "in one implementation" or "in an implementation", as well any other variations, appearing in various places throughout the present application are not necessarily all referring to the same exemplary embodiment.

Similarly, reference herein to "in accordance with an exemplary embodiment/example/implementation" or "in an exemplary embodiment/example/implementation", as well as other variations thereof, is frequently used to convey that a particular feature, structure, or characteristic (described in connection with the exemplary embodiment/example/implementation) may be included in at least one exemplary embodiment/example/implementation. Thus, the appearances of the expression "In accordance with an exemplary embodiment/example/implementation" or "in an exemplary embodiment/example/implementation" in various places in the present application are not necessarily all referring to the same exemplary embodiment/example/implementation, nor are separate or alternative exemplary embodiment/examples/implementation necessarily mutually exclusive of other exemplary embodiments/examples/implementation.

Reference numerals appearing in the claims are by way of illustration only and shall have no limiting effect on the scope of the claims, Although not explicitly described, the present exemplary embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received video picture (including possibly a received bitstream which encodes one or more video picture) in order to produce a final output suitable for display or for further processing in the reconstructed video domain. In various exemplary embodiments, such processes include one or more of the processes typically performed by a decoder. In various exemplary embodiments, such processes also, or alternatively, include processes performed by a decoder of various implementations described in the present application, for example.

As further examples, in one exemplary embodiment "decoding" may refer only to de-quantizing, in one exemplary embodiment "decoding" may refer to entropy decoding, in another exemplary embodiment "decoding" may refer only to differential decoding, and in another exemplary embodiment "decoding" may refer to combinations of de-quantizing, entropy decoding and differential decoding, Whether the phrase "decoding process" may be intended to refer specifically to a subset of operations or generally to the broader decoding process will be clear based on the context of the specific description and is believed to be well understood by those skilled in the art.

Various implementations involve encoding. In an analogous way to the above discussion about "decoding", "encoding" as used in the present application may encompass all or part of the processes performed, for example, on an Input video picture in order to produce an output bitstream. In various exemplary embodiments, such processes include one or more of the processes typically performed by an encoder. In various exemplary embodiments, such processes also, or alternatively, include processes performed by an encoder of various implementations described in this application.

As further examples, in one exemplary embodiment "encoding" may refer only to quantizing, in one exemplary embodiment "encoding" may refer only to entropy encoding, in another exemplary embodiment "encoding" may refer only to differential encoding, and in another exemplary embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, the present application may refer to "obtaining" various pieces of information, Obtaining the information may include one or more of, for example, estimating the information, calculating the information, predicting the information, or retrieving the information from memory, processing the information, moving the information, copying the information, erasing the information, calculating the information, determining the information, predicting the information, or estimating the information.

Additionally, this application may refer to "receiving" various pieces of information. Receiving the information may include one or more of, for example, accessing the information, or receiving information from a communication network.

Also, as used herein, the word "signal" refers to, among other things, indicating something to a corresponding decoder. For example, in certain exemplary embodiments the encoder signals a particular information such as coding parameter or encoded video picture data. In this way, in an exemplary embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (Implicit signaling) to simply allow the decoder to know and select the particular parameter. By avoiding transmission of any actual functions, a bit savings is realized in various exemplary embodiments. It is to be appreciated that signaling may be accomplished in a variety of ways. For example, one or more syntax elements, flags, and so forth are used to signal information to a corresponding decoder in various exemplary embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for encoding a video picture comprising at least one picture area, the method comprising:
   selecting a conversion mode defining a combination of at least one flipping operation and at least one rotation operation to the at least one picture area;
   converting the at least one picture area, based on the selected conversion mode, into at least one converted picture area; and
   encoding the at least one converted picture area into a bitstream of encoded video picture data;
   wherein the conversion mode is selected from a list of candidate conversion modes obtained by:
      obtaining an at least partially converted picture area by converting the at least one picture area with a candidate conversion mode; and
      adding the candidate conversion mode to the list of candidate conversion modes when a distance between a main direction determined from the at least partially converted picture area and a target direction of the at least one picture area complies with a threshold.

2. The method of claim 1, wherein the at least one rotation operation is a rotation of 90°, 180° or 270°.

3. The method of claim 1, wherein the conversion mode is selected from the list of candidate conversion modes by minimizing a rate-distortion trade-off.

4. The method of claim 1, wherein if a main direction determined from the at least partially converted picture area is vertical and/or horizontal, the conversion mode is selected by aligning the main direction with boundaries of coding units.

5. The method of claim 1, wherein the method further comprises signaling, into the bitstream of encoded video picture data, area conversion information indicating that at least one picture area of the video picture is converted according to a conversion mode.

6. The method of claim 5, wherein the area conversion information further defines the conversion mode selected for converting the least one picture area of the video picture.

7. An encoder comprising:
   a processor; and
   a memory storing instructions executable by the processor;
   wherein the processor is configured to perform the method of claim 1.

8. A non-transitory storage medium carrying instructions of program code for executing the method of claim 1.

9. A method for decoding a video picture from a bitstream of encoded video picture data, wherein the method comprises:

obtaining a decoded video picture by decoding encoded video picture data from the bitstream of encoded video picture data;

obtaining the video picture by de-converting, according to a conversion mode, at least one picture area of the decoded video picture, wherein the conversion mode defines a combination of at least one flipping operation and at least one rotation operation to the picture area;

parsing area conversion information within the bitstream of encoded video picture data; and determining, based on the area conversion information, the conversion mode according to which the at least one picture area is de-converted.

10. The method of claim 9, wherein the at least one rotation operation is a rotation of 90°, 180° or 270°.

11. A non-transitory storage medium carrying instructions of program code for executing the method of claim 9.

12. A decoder comprising:

a processor; and a memory storing instructions executable by the processor;

wherein the processor is configured to:

obtain a decoded video picture by decoding encoded video picture data from a bitstream of encoded video picture data;

obtain a video picture by de-converting, according to a conversion mode, at least one picture area of the decoded video picture, wherein the conversion mode defines a combination of at least one flipping operation and at least one rotation operation to the picture area;

parse area conversion information within the bitstream of encoded video picture data; and determine, based on the area conversion information, the conversion mode according to which the at least one picture area is de-converted.

13. The decoder of claim 12, wherein the at least one rotation operation is a rotation of 90°, 180° or 270°.

* * * * *